United States Patent
Shimizu et al.

(10) Patent No.: US 7,193,822 B2
(45) Date of Patent: Mar. 20, 2007

(54) THIN FILM MAGNETIC HEAD, HEAD GIMBAL ASSEMBLY, AND HARD DISK DRIVE

(75) Inventors: Tomoaki Shimizu, Tokyo (JP); Koji Shimazawa, Tokyo (JP); Kosuke Tanaka, Tokyo (JP); Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 417 days.

(21) Appl. No.: 10/861,472

(22) Filed: Jun. 7, 2004

(65) Prior Publication Data

US 2004/0264066 A1    Dec. 30, 2004

(30) Foreign Application Priority Data

Jun. 30, 2003    (JP) .............................. 2003-186388

(51) Int. Cl.
*G11B 5/127*    (2006.01)
(52) U.S. Cl. .................................................. 360/324.1
(58) Field of Classification Search ..................... None
See application file for complete search history.

(56) References Cited

U.S. PATENT DOCUMENTS

| 6,118,642 A | 9/2000 | Benenati et al. |
| 6,146,776 A | 11/2000 | Fukuzawa et al. |
| 6,430,012 B1 * | 8/2002 | Sano et al. .............. 360/324.1 |
| 2004/0264066 A1 | 12/2004 | Shimizu et al. |
| 2005/0018367 A1 | 1/2005 | Terunuma et al. |

FOREIGN PATENT DOCUMENTS

| JP | 10-312512 | 11/1998 |
| JP | 10-312514 | 11/1998 |

OTHER PUBLICATIONS

U.S. Appl. No. 11/103,563, filed Apr. 12, 2005, Shimazawa et al.
U.S. Appl. No. 11/105,554, filed Apr. 14, 2005, Shimazawa et al.

* cited by examiner

*Primary Examiner*—Allen Cao
(74) *Attorney, Agent, or Firm*—Oblon, Spivak, McClelland, Maier & Neustadt; P.C.

(57) ABSTRACT

At both end portions of at least a soft magnetic layer of a magneto-resistive effect film, a pair of bias magnetic field applying layers are disposed for applying a longitudinal bias magnetic field to the soft magnetic layer via magnetic underlayers. Further, mutual lattice point-to-point distances in the plane where each magnetic underlayer and the corresponding bias magnetic field applying layer are mated, are substantially equalized to each other. Therefore, a coercive force Hc in an in-plane direction (direction parallel to a film surface) of each bias magnetic field applying layer can be maintained at a high level so that even when further gap narrowing or track narrowing is aimed, the bias magnetic field applying layers can act to apply an effective bias magnetic field, i.e. can act to suppress occurrence of the Barkhausen noise.

15 Claims, 20 Drawing Sheets

MAGNETIZATION DIRECTION ↑

MAGNETIZATION DIRECTION ↑

F I G. 17
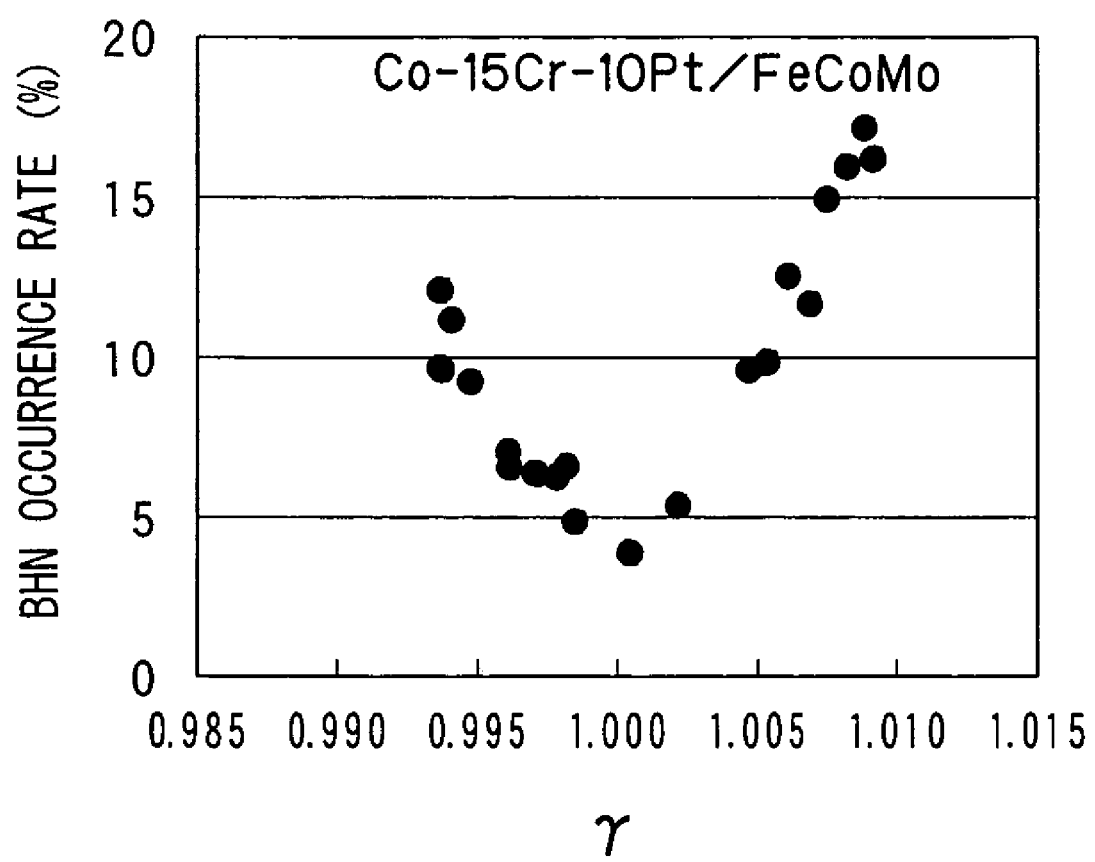

THIN FILM MAGNETIC HEAD, HEAD GIMBAL ASSEMBLY, AND HARD DISK DRIVE

BACKGROUND OF THE INVENTION

1. Field of the Invention

The present invention relates to a thin film magnetic head comprising a magneto-resistive effect element for reading as a signal a magnetic field strength of a magnetic recording medium or the like, and further relates to a head gimbal assembly and a hard disk drive each including such a thin film magnetic head.

2. Description of the Related Art

In recent years, following improvement in areal recording density of a hard disk drive, improvement in performance of a thin film magnetic head has been required. As the thin film magnetic head, use has been widely made of a composite thin film magnetic head having a structure wherein a reproducing head comprising a read-only magneto-resistive effect element (hereinafter may also be referred to simply as "MR element"), and a recording head comprising a write-only induction-type electromagnetic transducer element are stacked relative to a substrate.

As the MR element, there can be cited an AMR element using an anisotropic magneto-resistive effect, a GMR element using a giant magneto-resistive effect, a TMR element using a tunnel-type magneto-resistive effect, or the like.

As the GMR element, a spin-valve GMR element has been often used. The spin-valve GMR element comprises a nonmagnetic layer, a soft magnetic layer formed on one surface of the nonmagnetic layer, a ferromagnetic layer formed on the other surface of the nonmagnetic layer, and a pinning layer (generally an antiferromagnetic layer) formed on the ferromagnetic layer on its side apart from the nonmagnetic layer. The soft magnetic layer is a layer that acts to change its magnetization direction depending on a signal magnetic field from the external. The ferromagnetic layer is a layer of which a magnetization direction is fixed by a magnetic field from the pinning layer (antiferromagnetic layer).

Large output and small Barkhausen noise are required as characteristics of the reproducing head. Generally, for reducing the Barkhausen noise, a bias magnetic field is applied to the MR element in a longitudinal direction (hereinafter, this bias magnetic field will be referred to as "longitudinal bias magnetic field"). The application of the longitudinal bias magnetic field to the MR element is carried out by, for example, disposing bias magnetic field applying layers each in the form of a permanent magnet, a stacked body of a ferromagnetic layer and an antiferromagnetic layer, or the like on both sides of the MR element.

On the other hand, in order to cope with further increase in magnetic recording density, there have been required reduction in track width of the MR reproducing head and reduction in shield gap length representing a distance between two shield layers disposed on upper and lower sides of the MR element.

As described above, in the MR reproducing head, the bias magnetic field applying layers such as the permanent magnets are disposed on both sides of the MR element to cancel magnetic domains of the magnetism sensitive layers (particularly the soft magnetic layer) by a longitudinal bias magnetic field applied from the bias magnetic field applying layers, thereby to suppress the Barkhausen noise.

However, because of the gap narrowing and track narrowing of the MR reproducing head, it has been getting difficult to effectively apply the longitudinal bias magnetic field to the magnetism sensitive layers (particularly the soft magnetic layer). Particularly, there has arisen a problem that the Barkhausen noise becomes more liable to occur as the track width is reduced.

In order to solve such problems, JP-A-H10-312512 and JP-A-H10-312514 have proposed that FeCo magnetic underlayers are interposed at connecting portions between bias magnetic field applying layers each made of a Co hard magnetic layer and an MR element. It is described that, by providing the FeCo magnetic underlayers, magnetic separation between the bias magnetic field applying layers and the MR element can be avoided so that a stable and effective bias magnetic field can be applied to magnetism sensitive layers.

However, as a result of assiduous studies by the present inventors, it has been known that, in the foregoing proposed structure, presumably based on the fact that c-axis in-plane orientation of the Co hard magnetic layers each formed on the FeCo underlayer is degraded, a coercive force Hc in an in-plane direction (direction parallel to a film surface) of each bias magnetic field applying layer made of the Co hard magnetic layer tends to be reduced. Therefore, even in case of the foregoing proposed structure, if further gap narrowing or track narrowing is aimed, there arises a tendency that the effective bias magnetic field can not be applied, thus resulting in possibility that occurrence of the Barkhausen noise can not be effectively suppressed.

The present invention has been made under these circumstances and has an object to provide a thin film magnetic head that can maintain at a high level a coercive force Hc in an in-plane direction of each of bias magnetic field applying layers so that even when further gap narrowing or track narrowing is aimed, an effective bias magnetic field can be applied to thereby suppress occurrence of the Barkhausen noise, and has a further object to provide a head gimbal assembly and a hard disk drive each comprising such an improved thin film magnetic head.

SUMMARY OF THE INVENTION

For accomplishing the foregoing object, according to one aspect of the present invention, there is obtained a thin film magnetic head comprising a magneto-resistive effect element having a magneto-resistive effect film, wherein the magneto-resistive effect film is a multilayer film comprising a nonmagnetic layer, a ferromagnetic layer formed on one surface of the nonmagnetic layer, a soft magnetic layer formed on the other surface of the nonmagnetic layer, and a pinning layer formed so as to contact with one surface of the ferromagnetic layer (a surface of the ferromagnetic layer opposite to a surface thereof contacting with the nonmagnetic layer) for pinning a magnetization direction of the ferromagnetic layer, wherein, at both end portions of at least the soft magnetic layer of the magneto-resistive effect film, a pair of bias magnetic field applying layers are disposed for applying a longitudinal bias magnetic field to the soft magnetic layer via magnetic underlayers, and wherein mutual lattice point-to-point distances in a plane where each of the magnetic underlayers and the corresponding bias magnetic field applying layer are mated, are substantially equal to each other within an allowable error range of ±0.5%.

According to another aspect of the present invention, there is obtained a thin film magnetic head comprising a magneto-resistive effect element having a magneto-resistive effect film, wherein the magneto-resistive effect film is a multilayer film comprising a nonmagnetic layer, a ferromagnetic layer formed on one surface of the nonmagnetic layer, a soft magnetic layer formed on the other surface of the nonmagnetic layer, and a pinning layer formed so as to contact with one surface of the ferromagnetic layer (a surface of the ferromagnetic layer opposite to a surface thereof contacting with the nonmagnetic layer) for pinning a magnetization direction of the ferromagnetic layer, wherein, at both end portions of at least the soft magnetic layer of the magneto-resistive effect film, a pair of bias magnetic field applying layers are disposed for applying a longitudinal bias magnetic field to the soft magnetic layer via magnetic underlayers, wherein each of the magnetic underlayers has a crystal structure of a hexahedral cubic system, and an isodiametric lattice constant thereof is represented by a, wherein each of the bias magnetic field applying layers has a crystal structure of a hexagonal prism hexagonal system, a lattice constant in a hexagonal plane thereof is represented by b, and a lattice constant in a height direction of a hexagonal prism thereof is represented by c, and wherein a ratio between a value of $\sqrt{2}a$ and a value of $(\sqrt{3}b+c)/2$ is set within a range of 0.995 to 1.005 so that mutual lattice point-to-point distances in a plane where each of the magnetic underlayers and the corresponding bias magnetic field applying layer are mated, are substantially equalized to each other.

As a preferred mode of the present invention, it is configured such that each of the bias magnetic field applying layers is made of a Co hard magnetic layer containing Co as a main component, and each of the magnetic underlayers is made of a material that contains FeCo as a main component and at least one selected from the group consisting of Mo, W, Ni, Cr, Nb, Ta, V, Pt, Pd, Ir, Rh, Ru, and Au.

As a preferred mode of the present invention, it is configured such that the Co hard magnetic layer is made of CoPt, CoCrPt, CoCrTa, or an alloy containing one of them.

As a preferred mode of the present invention, it is configured such that each of the magnetic underlayers is made of FeCoMo, and the content of Mo is 5 to 15 at %.

As a preferred mode of the present invention, it is configured such that each of the magnetic underlayers is made of FeCoW, and the content of W is 3 to 10 at %.

As a preferred mode of the present invention, it is configured such that a thickness of each of the magnetic underlayers is 1.2 to 5.5 nm.

According to another aspect of the present invention, there is obtained a head gimbal assembly comprising a slider including the foregoing thin film magnetic head and disposed so as to confront a recording medium, and a suspension elastically supporting the slider.

According to another aspect of the present invention, there is obtained a hard disk drive comprising a slider including the foregoing thin film magnetic head and disposed so as to confront a disc-shaped recording medium driven to be rotated, and a positioning device supporting the slider and positioning the slider relative to the recording medium.

At both end portions of at least a soft magnetic layer of a magneto-resistive effect film, a pair of bias magnetic field applying layers are disposed for applying a longitudinal bias magnetic field to the soft magnetic layer via magnetic underlayers. Further, mutual lattice point-to-point distances in the plane where each magnetic underlayer and the corresponding bias magnetic field applying layer are mated, are substantially equalized to each other. Therefore, a coercive force Hc in an in-plane direction (direction parallel to a film surface) of each bias magnetic field applying layer can be maintained at a high level so that even when further gap narrowing or track narrowing is aimed, the bias magnetic field applying layers can act to apply an effective bias magnetic field, i.e. can act to suppress occurrence of the Barkhausen noise.

BRIEF DESCRIPTION OF THE DRAWINGS

FIG. 17 is a graph showing a relationship between matching degree γ of mutual lattice point-to-point distances in the plane where a magnetic underlayer and a bias magnetic field applying layer are mated, and occurrence rate (%) of the Barkhausen noise (BHN);

DETAILED DESCRIPTION OF THE INVENTION

Now, specific embodiments of the present invention will be described hereinbelow with reference to the drawings.

The gist of the present invention resides in a structure of a magneto-resistive effect element having a magneto-resistive effect film and incorporated in a reproducing head.

Figure 1:
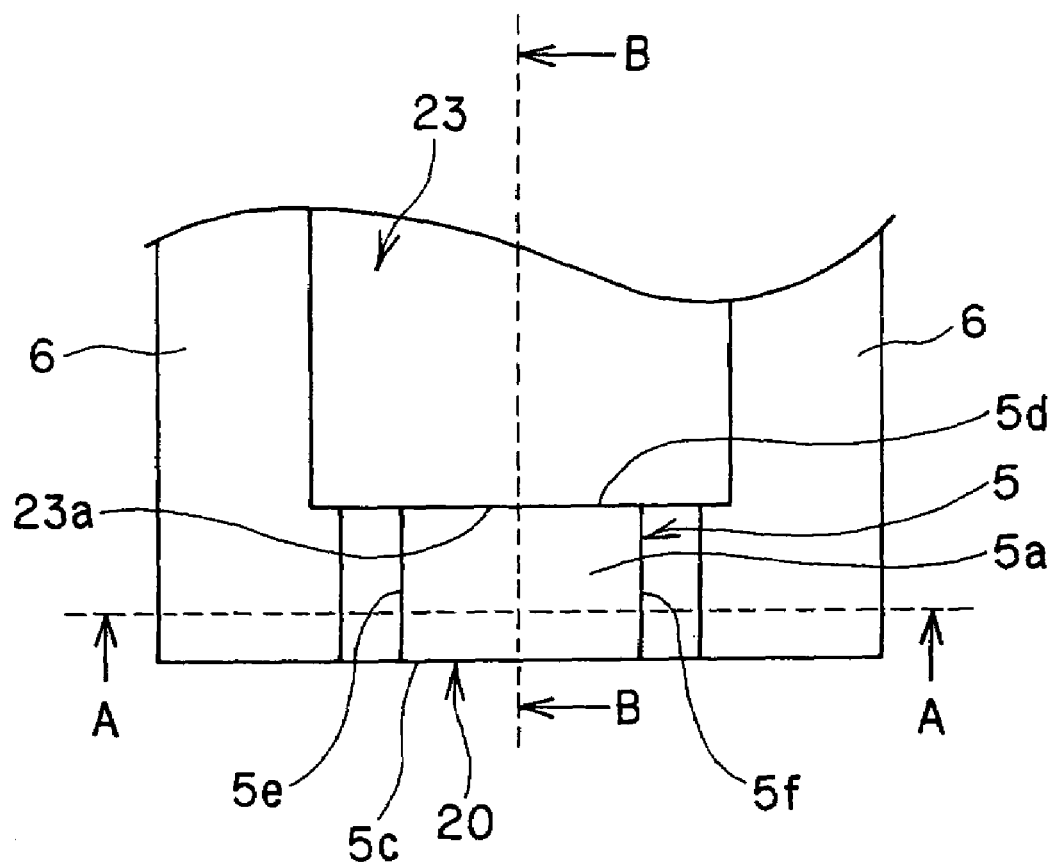
FIG. 1 is a plan view showing the main part of a reproducing head in an embodiment of the present invention.
Figure 2:
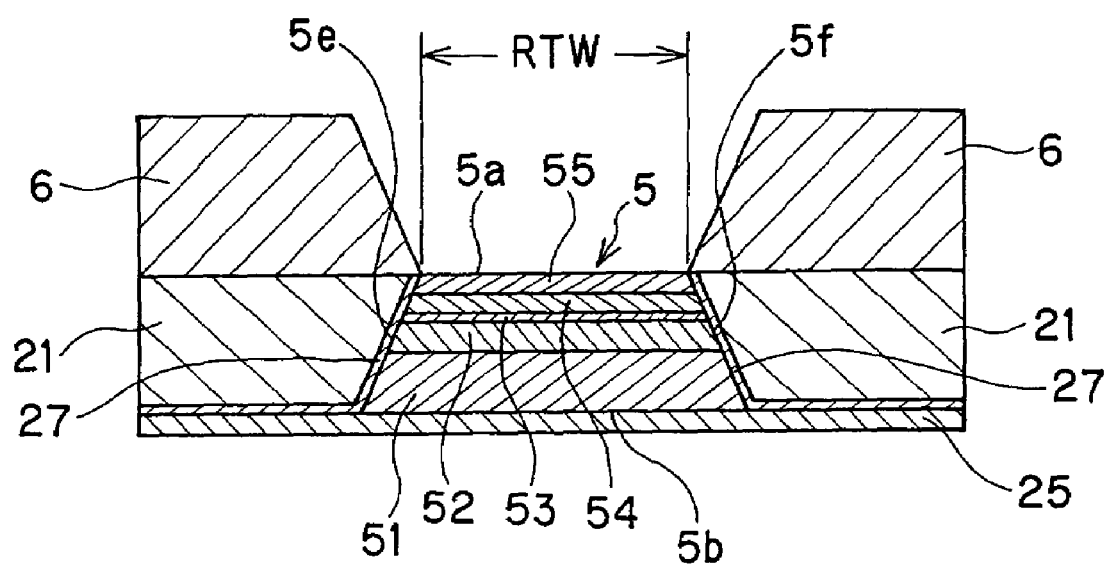
FIG. 2 is a sectional view taken along line A—A in FIG. 1.
Figure 3:
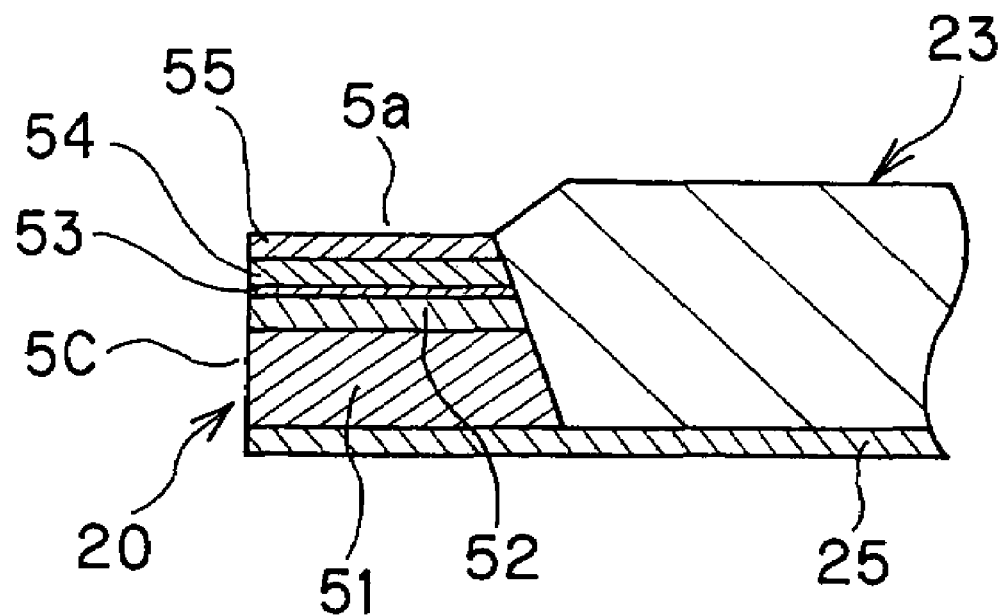
FIG. 3 is a sectional view taken along line B—B in FIG. 1.

FIG. 1 is a plan view showing the main part of a reproducing head in an embodiment of the present invention, FIG. 2 is a sectional view taken along line A—A in FIG. 1, and FIG. 3 is a sectional view taken along line B—B in FIG. 1.

As shown in FIG. 2, a magneto-resistive effect film forming a magneto-resistive effect element (MR element) 5 has a multilayer film structure comprising a nonmagnetic layer 53, a ferromagnetic layer 52 formed on one surface (in this embodiment, on the lower side in FIG. 2) of the nonmagnetic layer 53, a soft magnetic layer 54 formed on the other surface (in this embodiment, on the upper side in FIG. 2) of the nonmagnetic layer 53 and capable of acting to freely change a magnetization direction in response to an external magnetic field serving as magnetic information, and a pinning layer 51 formed so as to contact with one surface of the ferromagnetic layer 52 (a surface of the ferromagnetic layer 52 opposite to a surface thereof contacting with the nonmagnetic layer 53) for pinning a magnetization direction of the ferromagnetic layer 52.

The illustrated preferred example is of a so-called pinning layer bottom type spin-valve film structure in which the pinning layer 51 is located on the bottom side.

More specifically, it is the structure in which the pinning layer 51, the ferromagnetic layer 52, the nonmagnetic layer 53, the soft magnetic layer 54, and a protective layer 55 are stacked on an underlayer 25 in the order named. The ferromagnetic layer 52 is a layer of which the magnetization direction is fixed, and is normally formed by a ferromagnetic film. The ferromagnetic layer 52 is not limited to the structure of the single layer, but may be of a multilayer structure that acts like a ferromagnetic film. For example, a stacked body of CoFe/Ru/CoFe can be cited as a preferred example.

The pinning layer 51 is a layer for fixing the magnetization direction in the ferromagnetic layer 52, and is normally formed by an antiferromagnetic film of PtMn or the like. The nonmagnetic layer 53 is formed by, for example, a Cu film. The soft magnetic layer 54 is a layer of which a magnetization direction changes depending on a signal magnetic field from a recording medium, and is normally formed by a soft magnetic film. The soft magnetic layer 54 is not limited to the structure of the single layer, but may be of a multilayer structure that acts like a soft magnetic film. For example, a stacked body of CoFe/NiFe can be cited as a preferred example.

As a material of the protective layer 55, Ta, for example, is used.

Then, as shown in FIG. 2, at both end portions 5e and 5f of at least the soft magnetic layer 54 of the magneto-resistive effect film forming the magneto-resistive effect element (MR element) in the present invention, a pair of bias magnetic field applying layers 21 and 21 are disposed, respectively, for applying a longitudinal bias magnetic field to the soft magnetic layer 54 via magnetic underlayers 27 and 27. That is, the magnetic underlayers 27 and 27 are provided at connecting portions between the magneto-resistive effect element 5 and the bias magnetic field applying layers 21 and 21. And thereon, two electrode layers 6 and 6 are formed for causing a sense current, being a current for magnetic signal detection, to flow through the MR element 5. Each electrode layer 6 is made of a conductive material such as Au.

The gist of the present invention resides in the structure of the magneto-resistive effect element having the magneto-resistive effect film and incorporated in the reproducing head and, in particular, in structures of each of the magnetic underlayers and each of the bias magnetic field applying layers disposed on both end portions of at least the soft magnetic layer of the magneto-resistive effect film.

Specifically, in the present invention, it is configured such that mutual lattice point-to-point distances in the plane where the magnetic underlayer 27 and the bias magnetic field applying layer 21 are mated, are substantially equal to each other within an allowable error range of ±0.5%, preferably ±0.3%. By setting the mutual lattice point-to-point distances as described above, a coercive force Hc in an in-plane direction of the bias magnetic field applying layer can be maintained at a high level so that even when further gap narrowing or track narrowing of the reproducing head is aimed, an effective bias magnetic field can be applied to thereby suppress occurrence of the Barkhausen noise.

Description will be made in detail hereinbelow of the setting of the mutual lattice point-to-point distances in the plane where the magnetic underlayer 27 and the bias magnetic field applying layer 21 are mated.

Structure of Magnetic Underlayer 27

Figure 4:
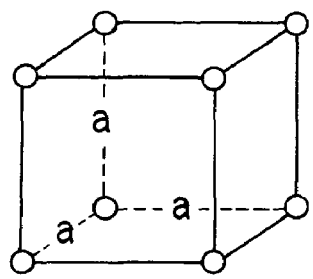
FIG. 4 is a perspective view exemplarily showing a crystal structure of a hexahedral cubic system.

The magnetic underlayer 27 is made of a magnetic material having a crystal structure of a hexahedral cubic system as illustrated in FIG. 4. The crystal structure illustrated in FIG. 4 has an isodiametric lattice constant a. As a specific magnetic material for forming the magnetic underlayer 27 usable in this invention, there can be cited such a material that contains FeCo as a main component and at least one selected from the group consisting of Mo, W, Ni, Cr, Nb, Ta, V, Pt, Pd, Ir, Rh, Ru, and Au, as a preferred example. Among them, it is desirable to use FeCoMo or FeCoW.

Preferably, a thickness of the magnetic underlayer 27 falls within a range of 1.2 to 5.5 nm, particularly within a range of 1.5 to 5.0 nm. If this value is less than 1.2 nm, there arises a disadvantage that a squareness ratio is reduced to cause it susceptible to an influence of an external magnetic field so that the occurrence rate of the Barkhausen noise tends to be increased. If this value exceeds 5.5 nm, there arises a disadvantage that a coercive force is lowered so that the occurrence rate of the Barkhausen noise also tends to be increased.

Structure of Bias Magnetic Field Applying Layer 21

Figure 6:
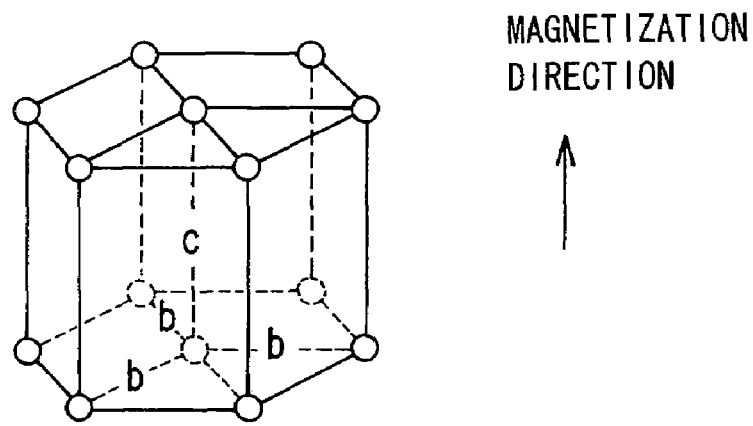
FIG. 6 is a perspective view exemplarily showing a crystal structure of a hexagonal prism hexagonal system.

The bias magnetic field applying layer 21 has a crystal structure of a hexagonal prism hexagonal system as illustrated in FIG. 6, wherein a lattice constant in the hexagonal plane is represented by b, while a lattice constant in a height direction of the hexagonal prism is represented by c. The c-axis direction corresponds to a magnetization direction. As a specific magnetic material for forming the bias magnetic field applying layer 21, there can be cited a Co hard magnetic layer containing Co as a main component, as a preferred example. It is desirable to use CoPt, CoCrPt, CoCrTa, or an alloy containing one of them as a main component. A thickness of the bias magnetic field applying layer 21 is set to about 10 to 100 nm. If this thickness is too thin, a coercive force is reduced, while, if this thickness is too thick, the sensitivity of a free layer is lowered so that an output can be yielded.

Figure 5:
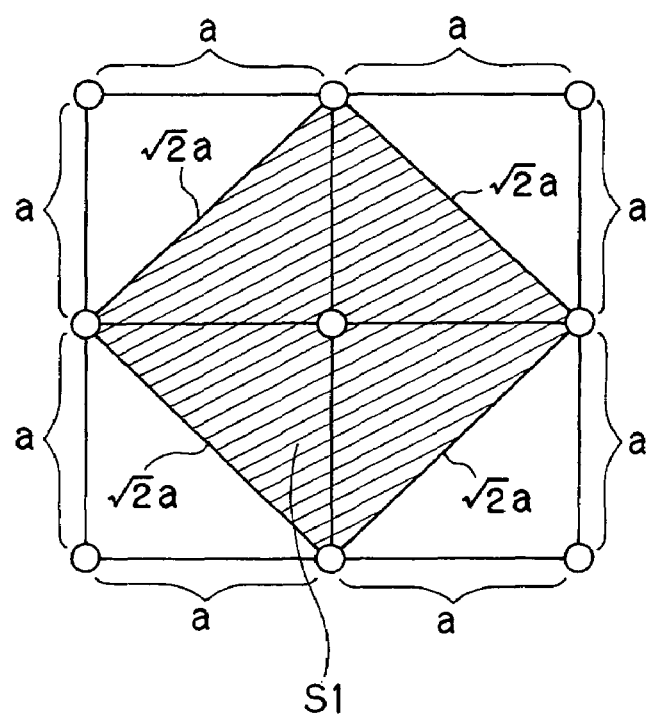
FIG. 5 is a perspective view for explaining a square plane S1 (identified by hatching) having each side with a length of $\sqrt{2}a$ and extending over four crystals.
Figure 7:
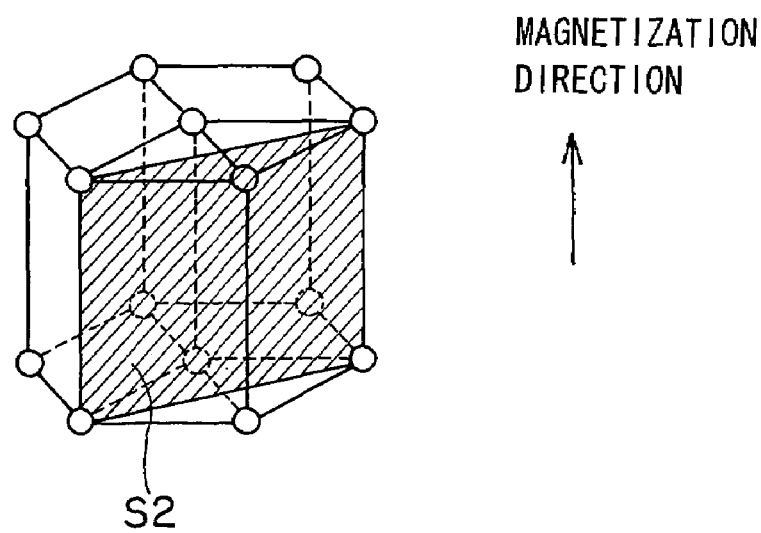
FIG. 7 is a perspective view for explaining a generally square plane S2 (identified by hatching) of the hexagonal prism hexagonal system.

Setting of Mutual Lattice Point-to-Point Distances in the Plane where Magnetic Underlayer 27 and Bias Magnetic Field Applying Layer 21 are Mated As described above, the magnetic underlayer 27 is made of the magnetic material having the crystal structure of the hexahedral cubic system as illustrated in FIG. 4 and has the isodiametric lattice constant a. As a result of assiduous studies about a joining state between the magnetic underlayer 27 and the bias magnetic field applying layer 21, particularly in an interface therebetween, and a physical phenomenon following it, the present inventors have found out that it is an important factor for reducing the Barkhausen noise to form films such that a hatched plane shown in FIG. 5, i.e. a square plane S1 having each side with a length of $\sqrt{2}a$ and extending over four crystals forming the magnetic underlayer 27, and a hatched plane shown in FIG. 7, i.e. a generally square plane S2 in the c-axis direction of a crystal forming the bias magnetic field applying layer 21, overlap each other, and further, to equalize sizes of the plane S1 of the magnetic underlayer 27 and the plane S2 of the bias magnetic field applying layer 21 to each other, i.e. substantially equalize the lengths of the sides of the squares to each other (equalize the mutual lattice point-to-point distances in the plane where the magnetic underlayer 27 and the bias magnetic field applying layer 21 are mated, to each other).

The length of each side of the square plane S1 of the magnetic underlayer 27 is $\sqrt{2}a$. On the other hand, the plane S2 of the bias magnetic field applying layer 21 is not a complete square. However, by deriving the arithmetic mean of lengths of two kinds of sides, i.e. $\sqrt{3}b$ and c, a mean length of each side is approximated to $(\sqrt{3}b+c)/2$. Then, it is necessary to set a ratio between a value of $\sqrt{2}a$ and a value of $(\sqrt{3}b+c)/2$ within a range of 0.995 to 1.005, preferably within a range of 0.997 to 1.003.

That is, the setting is implemented so that the mutual lattice point-to-point distances in the plane where the magnetic underlayer 27 and the bias magnetic field applying layer 21 are mated, are made substantially equal to each other. If this value becomes less than 0.995, there arises a disadvantage that a coercive force is reduced, while, if this value exceeds 1.005, there arises a disadvantage that a squareness ratio is reduced.

Incidentally, in the foregoing JP-A-H10-312512 and JP-A-H10-312514, a ratio between a value of $\sqrt{2}a$ and a value of $(\sqrt{3}b+c)/2$ with respect to a magnetic underlayer of Fe85Co15 and a bias magnetic field applying layer of Co80Pt20 is 0.990, which departs from the scope of the present invention.

In the present invention, there is no particular limitation about the technique of substantially equalizing mutual lattice point-to-point distances in the plane where the magnetic underlayer 27 and the bias magnetic field applying layer 21 are mated. On the other hand, it is one of desirable modes to have a predetermined element contained in a main component forming the magnetic underlayer 27 so as to adjust a lattice point-to-point distance by adjusting the content of such a predetermined element.

Figure 21:
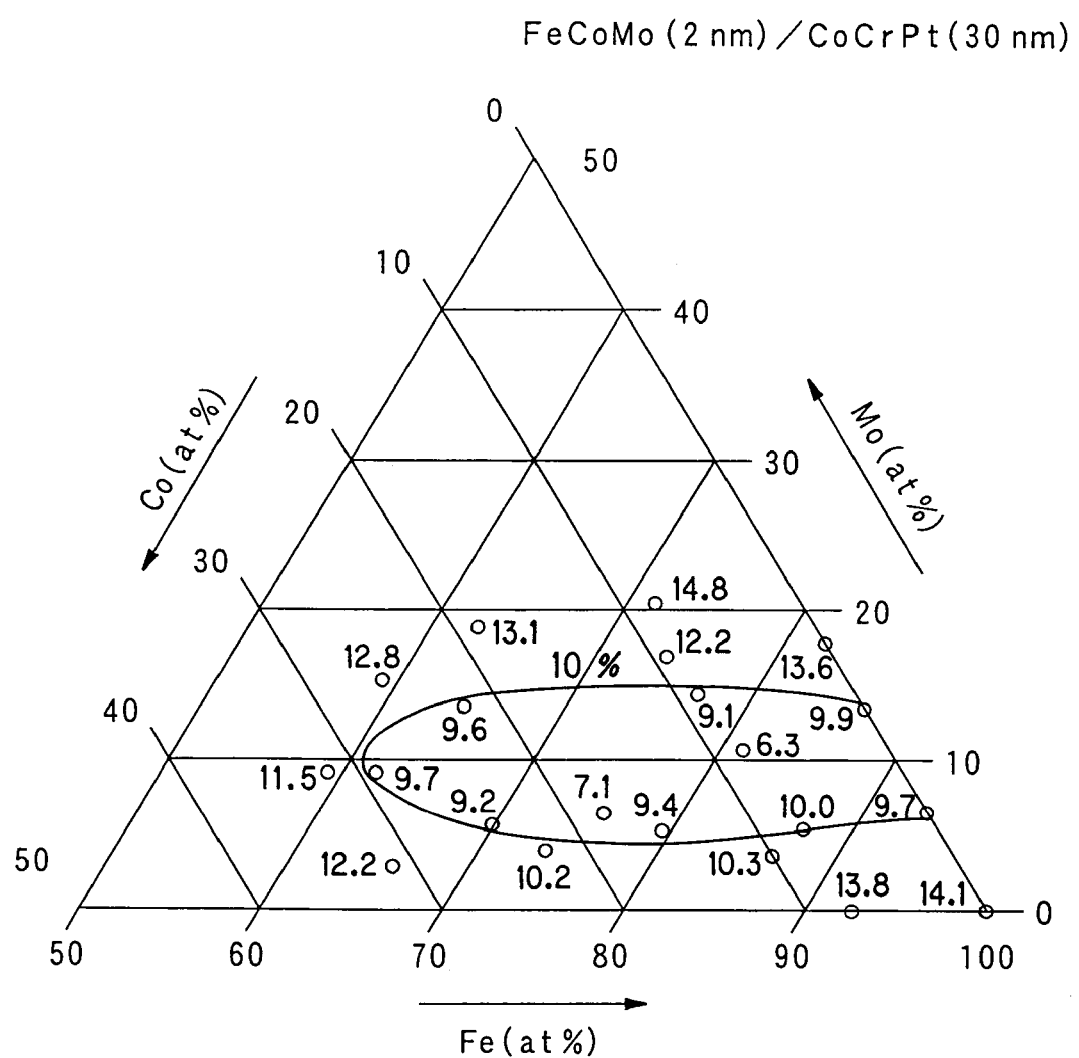
FIG. 21 is a diagram showing predetermined compositions in an FeCoMo ternary composition diagram, and occurrence rates of the Barkhausen noise when using such compositions.

For example, assuming that the bias magnetic field applying layer 21 is made of CoCrPt (78/9/13 in at %) and the magnetic underlayer 27 is made of FeCoMo, the content of Mo in the magnetic underlayer 27 that can substantially equalize mutual lattice point-to-point distances in the foregoing allowable range to achieve reduction in Barkhausen noise, is preferably 5 to 15 at %, particularly 7 to 13 at %. This state is shown in a ternary composition diagram of FIG. 21. Numerical values in the ternary composition diagram represent occurrence rates of the Barkhausen noise. It is seen that the occurrence rate of the Barkhausen noise is controlled to 10% or less by setting the content of Mo to 5 to 15 at %. Incidentally, a reproduction track width is set to 120 nm in this case.

Figure 22:
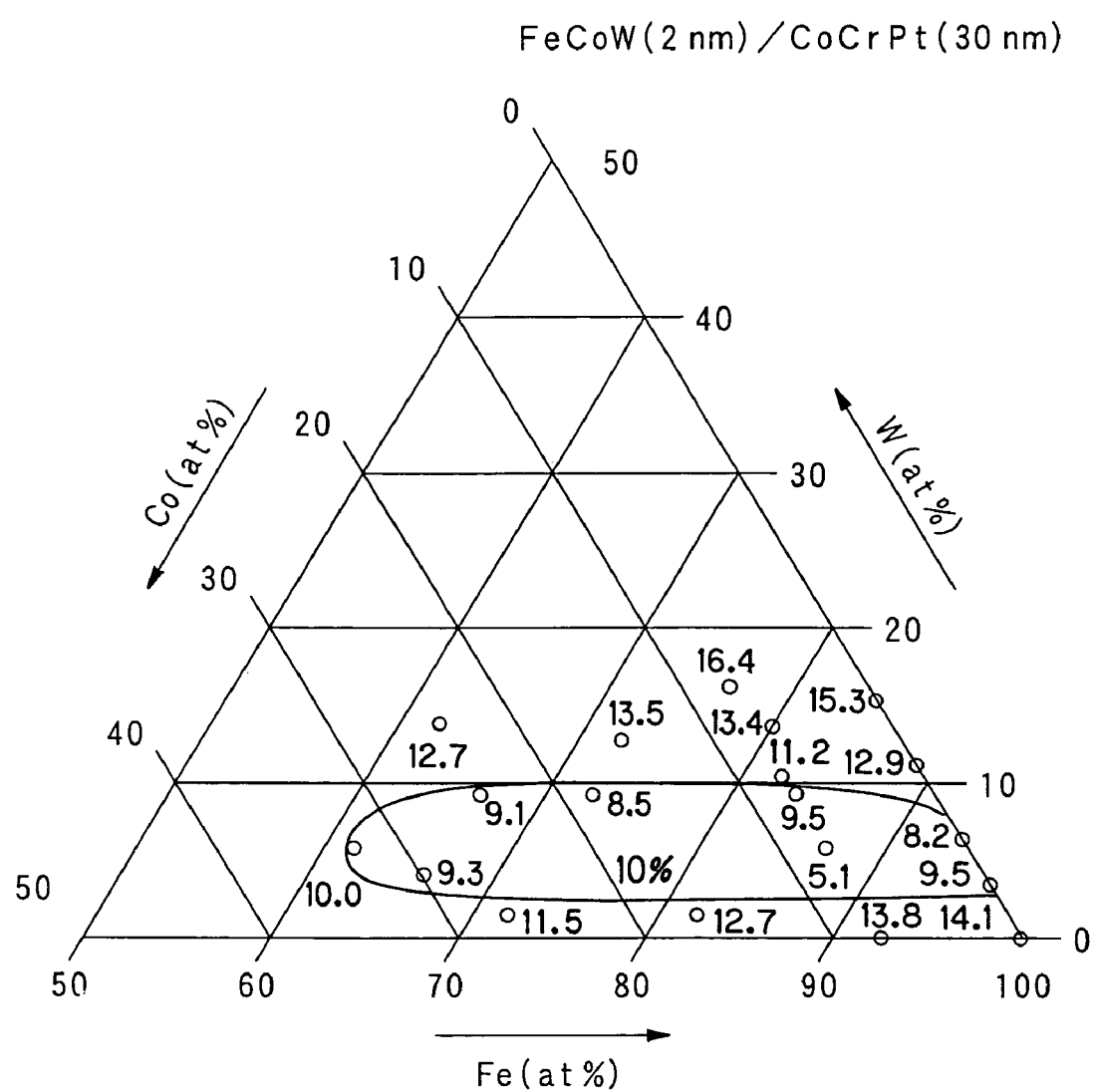
FIG. 22 is a diagram showing predetermined compositions in an FeCoW ternary composition diagram, and occurrence rates of the Barkhausen noise when using such compositions.

On the other hand, assuming that the bias magnetic field applying layer 21 is made of CoCrPt (78/9/13 in at %) and the magnetic underlayer 27 is made of FeCoW, the content of W in the magnetic underlayer 27 that can substantially equalize mutual lattice point-to-point distances in the foregoing allowable range to achieve reduction in Barkhausen noise, is preferably 3 to 10 at %, particularly 4.5 to 8.5 at %. This state is shown in a ternary composition diagram of FIG. 22. Numerical values in the ternary composition diagram represent occurrence rates of the Barkhausen noise. It is seen that the occurrence rate of the Barkhausen noise is controlled to 10% or less by setting the content of W to 3 to 10 at %. Incidentally, a reproduction track width is set to 120 nm in this case.

Other Structural Portions of Reproducing Head

Supplementary description will be briefly made of the structure of the reproducing head illustrated in FIGS. 1 to 3.

In this embodiment illustrated in FIGS. 1 to 3, an alumina ($Al_2O_3$) layer 23 is disposed on a side of the MR element 5 opposite to a side where an air bearing surface 20 is formed.

Further, the MR element 5 has two surfaces 5a and 5b facing opposite sides, an end portion 5c located at the air bearing surface 20, an end portion 5d on an opposite side relative to the end portion 5c, and two side portions 5e and 5f.

As described above, the bias magnetic field applying layers 21 and 21 are disposed so as to be adjacent to the side portions 5e and 5f of the MR element via the magnetic underlayers 27 and 27, respectively. As shown in FIG. 2, each magnetic underlayer 27 may be formed so as to extend not only over the side portion 5e or 5f of the MR element, but also over the underlayer 25 to thereby include a portion sandwiched between the bias magnetic field applying layer 21 and the underlayer 25.

Each electrode layer 6 is disposed on the bias magnetic field applying layer 21 and, in a region where no bias magnetic field applying layer 21 is provided, the electrode layer 6 is disposed on a later-described lower shield gap film.

As shown in FIGS. 2 and 3, the MR element 5 and the bias magnetic field applying layers 21 and 21 are disposed directly or indirectly on the underlayer 25. The underlayer 25 is disposed on the later-described lower shield gap film. As a material of the underlayer 25, Ta or NiCr, for example, is used. Incidentally, the MR element 5 and the bias magnetic field applying layers 21 and 21 may be disposed on the lower shield gap film without providing the underlayer 25.

Modification of Magneto-Resistive Effect Element

The multilayer film structure of the magneto-resistive effect element in the present invention is not limited to the foregoing so-called pinning layer bottom type spin-valve film structure in which the pinning layer 51 is located on the bottom side as shown in FIG. 2, and various modifications thereof may be made possible.

Figure 8:
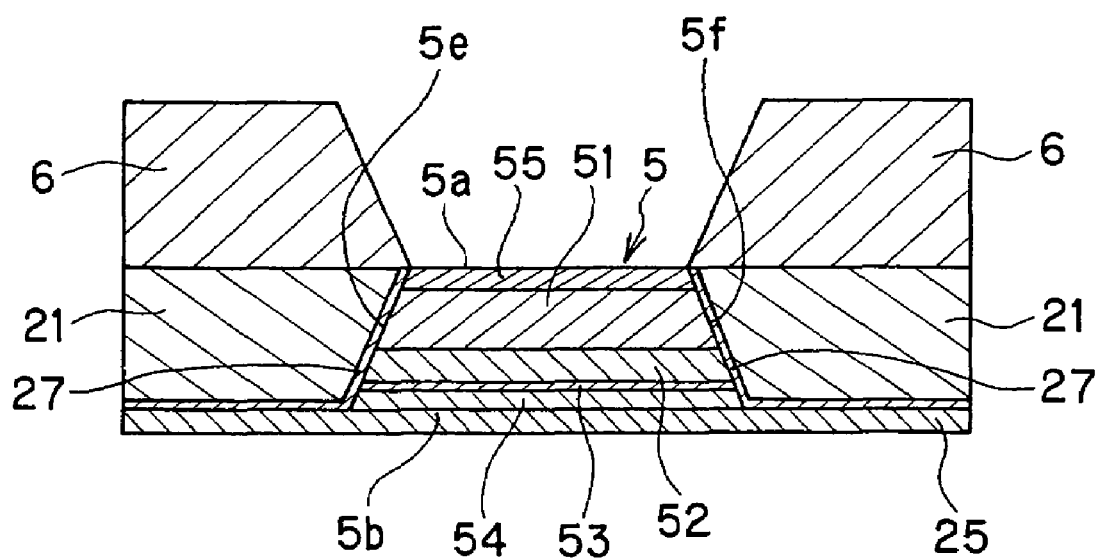
FIG. 8 is a sectional view for describing a so-called pinning layer top type spin-valve film structure wherein a pinning layer is disposed on the top side.

For example, as shown in FIG. 8, it may be a so-called pinning layer top type spin-valve film structure wherein the pinning layer 51 is disposed on the top side. Specifically, as shown in FIG. 8, it may be the structure in which the soft magnetic layer 54, the nonmagnetic layer 53, the ferromagnetic layer 52, the pinning layer 51, and the protective layer 55 may be stacked on the underlayer 25 in the order named. Further, although not illustrated, it may also be a so-called dual-type stacked film structure having two magnetism sensitive portions.

In this invention, the term "a magneto-resistive effect element" is not limited to the foregoing spin-valve film structure, but represents a concept widely including such an element that exhibits a magneto-resistive effect, for example, a TMR element using a tunnel-type magneto-resistive effect, or a CPP (Current Perpendicular to Plane)-GMR element.

Overall Structure of Thin Film Magnetic Head

Figure 9:
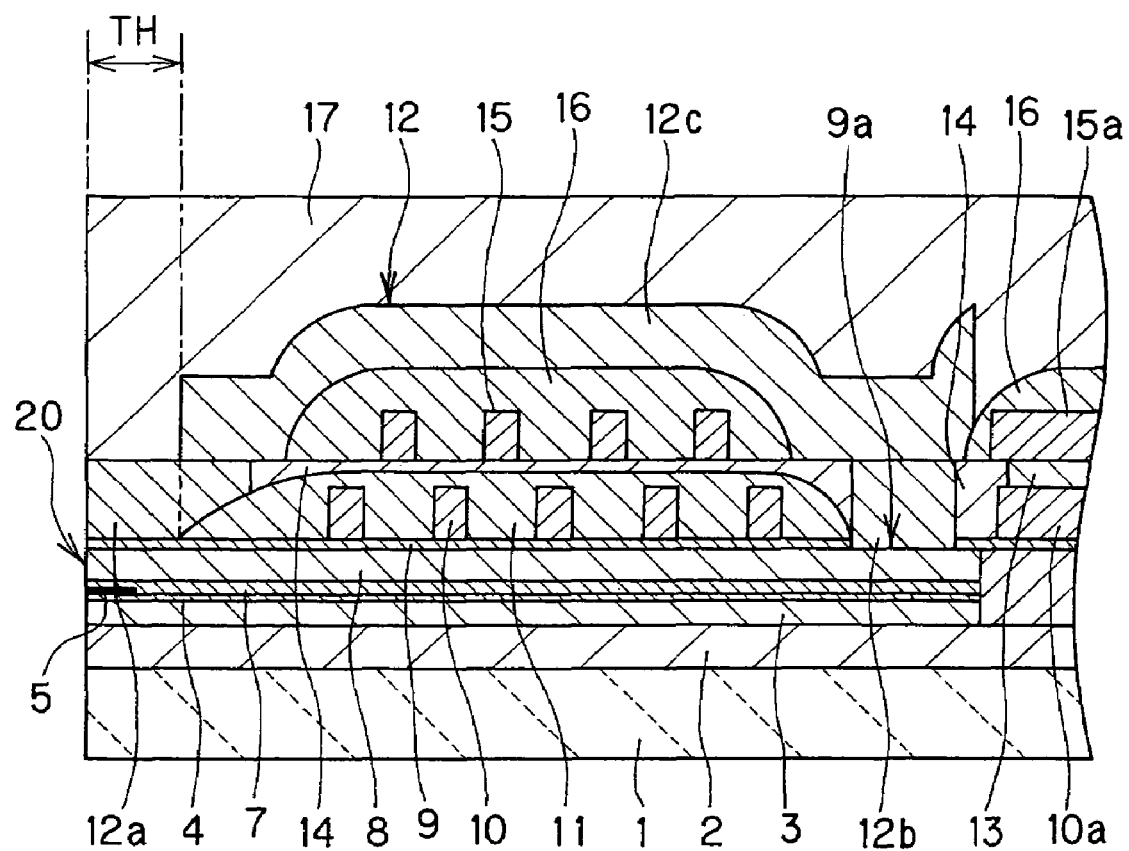
FIG. 9 is a diagram for describing a structure of a thin film magnetic head according to a preferred embodiment of the present invention, which shows a section of the thin film magnetic head perpendicular to an air bearing surface and a substrate.
Figure 10:
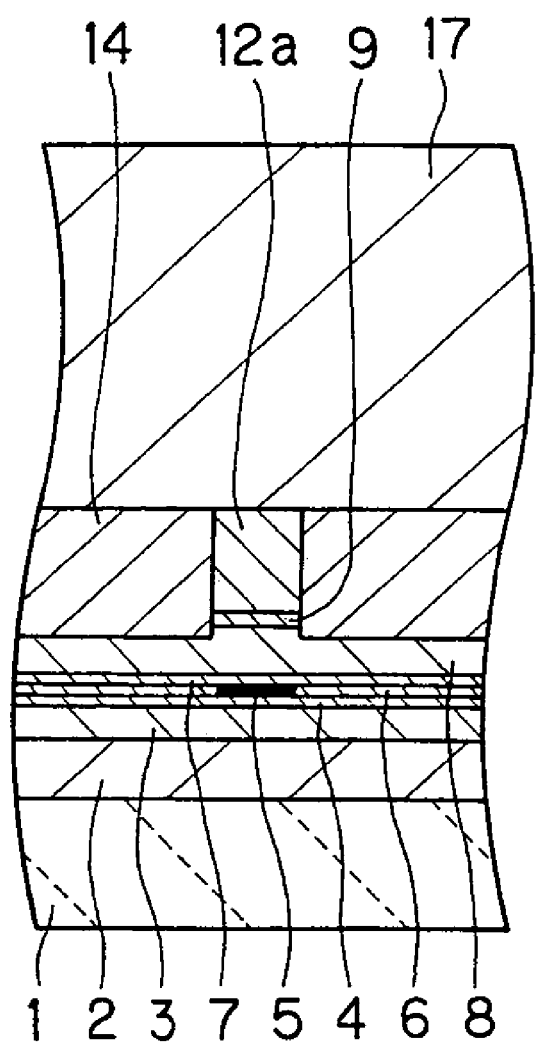
FIG. 10 is a diagram for describing a structure of the thin film magnetic head according to the preferred embodiment of the present invention, which shows a section of a magnetic pole portion of the thin film magnetic head parallel to the air bearing surface.

Now, description will be made of the overall structure of a thin film magnetic head having the foregoing magneto-resistive effect element. FIGS. 9 and 10 are diagrams for describing the structure of the thin film magnetic head according to a preferred embodiment of the present invention, wherein FIG. 9 shows a section of the thin film magnetic head perpendicular to an air bearing surface and a substrate, and FIG. 10 shows a section of a magnetic pole portion of the thin film magnetic head parallel to the air bearing surface. Herein, the air bearing surface represents a confronting surface of the thin film magnetic head confronting a magnetic recording medium.

It is expected that the overall structure of the thin film magnetic head can be easily understood by description along production processes thereof. To this end, the overall structure of the thin film magnetic head will be described hereinbelow on the basis of the production processes.

First, an insulating layer 2 made of an insulating material such as alumina ($Al_2O_3$) or silicon dioxide ($SiO_2$) is formed on a substrate 1 made of a ceramic material such as altic ($Al_2O_3$.Tic) by sputtering. A thickness of the insluting layer 2 is set to, for example, about 0.5 to 20 µm.

Then, on the insulating layer 2 is formed a lower shield layer 3 for a reproducing head, made of a magnetic material. A thickness thereof is set to, for example, about 0.1 to 5 µm. As the magnetic material of the lower shield layer 3, there can be cited, for example, FeAlSi, NiFe, CoFe, CoFeNi, FeN, FeZrN, FeTaN, CoZrNb, or CoZrTa. The lower shield layer 3 is formed by sputtering, plating, or the like.

Then, a lower shield gap film 4 made of an insulating material such as $Al_2O_3$ or $SiO_2$ is formed on the lower shield layer 3 by sputtering. A thickness thereof is set to, for example, about 10 to 200 nm.

Then, the magneto-resistive effect film for reproduction, the magnetic underlayers 27 and 27, the bias magnetic field applying layers 21 and 21, and the electrode layers 6 and 6, which are not illustrated, are formed on the lower shield gap film 4 for forming the magneto-resistive effect element (MR element) 5.

Then, an upper shield gap film 7 made of an insulating material such as alumina is formed in a thickness of, for example, 10 to 200 nm on the MR element 5 and the lower shield gap film 4 by sputtering.

Then, an upper shield layer 8 of the reproducing head made of a magnetic material and serving also as a lower magnetic pole layer of a recording head is formed in a thickness of, for example, about 3 to 4 µm on the upper shield gap film 7. The magnetic material of the upper shield layer 8 may be the same as that of the foregoing lower shield layer 3. The upper shield layer 8 is formed by sputtering, plating, or the like.

Incidentally, the upper shield layer 8 may be replaced with an upper shield layer, a separation layer made of a nonmagnetic material such as alumina and formed on the upper shield layer by sputtering or the like, and a lower magnetic pole layer formed on the separation layer. This is an example of the structure wherein functions of a magnetic pole and a shield are not achieved by one layer, but achieved by separate layers.

Then, a recording gap layer 9 made of an insulating material such as alumina is formed in a thickness of, for example, 50 to 300 nm on the upper shield layer 8 by sputtering or the like.

Then, the recording gap layer 9 is partly etched to form a contact hole 9a at a central portion of a later-described thin film coil for forming a magnetic circuit.

Then, a first layer portion 10 of the thin film coil made of, for example, copper (Cu) is formed in a thickness of, for example, 2 to 3 µm on the recording gap layer 9. In FIG. 9, symbol 10a denotes a connecting portion of the first layer portion 10 that is connected to a later-described second layer portion 15 of the thin film coil. The first layer portion 10 is wound around the contact hole 9a.

Then, an insulating layer 11, such as a photoresist, made of an organic material having fluidity upon heating is formed into a predetermined pattern so as to cover the first layer portion 10 of the thin film coil and the recording gap layer 9 in a peripheral region thereof.

Then, a heat treatment is carried out at a predetermined temperature for flattening the surface of the insulating layer 11. By this heat treatment, respective edge portions on the outer periphery and inner periphery of the insulating layer 11 are formed into a rounded slope shape.

Then, in a region from a slope portion of the insulating layer 11 on the side of the later-described air bearing surface 20 over the side of the air bearing surface 20, a track width regulating layer 12a of an upper magnetic pole layer 12 is formed on the recording gap layer 9 and the insulating layer 11 using a magnetic material for the recording head. The upper magnetic pole layer 12 comprises the track width regulating layer 12a, a later-described coupling portion layer 12b, and a later-described yoke portion layer 12c.

The track width regulating layer 12a has a tip portion formed on the recording gap layer 9 and serving as a magnetic pole portion of the upper magnetic pole layer 12, and a connecting portion formed on the slope portion of the insulating layer 11 on the side of the air bearing surface 20 and connected to the yoke portion layer 12c. A width of the tip portion is set equal to a recording track width. A width of the connecting portion is set larger than the width of the tip portion.

Upon forming the track width regulating layer 12a, the coupling portion layer 12b made of a magnetic material is simultaneously formed on the contact hole 9a, and further, a connection layer 13 made of a magnetic material is simultaneously formed on the connecting portion 10a. The coupling portion layer 12b constitutes a portion of the upper magnetic pole layer 12, which is magnetically coupled to the upper shield layer 8.

Then, magnetic pole trimming is carried out. Specifically, in a peripheral region of the track width regulating layer 12a, at least part of the recording gap layer 9 and a magnetic pole portion of the upper shield layer 8 on the side of the recording gap layer 9 is etched using the track width regulating layer 12a as a mask. Thereby, as shown in FIG. 10, a trim structure is formed wherein respective widths of at least part of the magnetic pole portion of the upper magnetic pole layer 12, the recording gap layer 9, and the magnetic pole portion of the upper shield layer 8 are made even. According to this trim structure, it is possible to prevent the increase in effective track width which is caused by spreading of magnetic flux in the neighborhood of the recording gap layer 9.

Then, an insulating layer 14 made of an inorganic insulating material such as alumina is formed over the whole in a thickness of, for example, 3 to 4 μm.

Then, the insulating layer 14 is polished by, for example, chemical mechanical polishing to the surfaces of the track width regulating layer 12a, the coupling portion layer 12b, and the connection layer 13, to thereby carry out flattening.

Then, on the flattened insulating layer 14, the second layer portion 15 of the thin film coil made of, for example, copper (Cu) is formed in a thickness of, for example, 2 to 3 μm. In FIG. 9, symbol 15a denotes a connecting portion of the second layer portion 15, which is connected to the connecting portion 10a of the first layer portion 10 of the thin film coil via the connection layer 13. The second layer portion 15 is wound around the coupling portion layer 12b.

Then, an insulating layer 16, such as a photoresist, made of an organic material having fluidity upon heating is formed into a predetermined pattern so as to cover the second layer portion 15 of the thin film coil and the insulating layer 14 in a peripheral region thereof.

Then, a heat treatment is carried out at a predetermined temperature for flattening the surface of the insulating layer 16. By this heat treatment, respective edge portions on the outer periphery and inner periphery of the insulating layer 16 are formed into a rounded slope shape.

Then, the yoke portion layer 12c forming a yoke portion of the upper magnetic pole layer 12 is formed on the track width regulating layer 12a, the insulating layers 14 and 16, and the coupling portion layer 12b, using a magnetic material for the recording head such as Permalloy. An end portion of the yoke portion layer 12c on the side of the air bearing surface 20 is located at a position apart from the air bearing surface 20. The yoke portion layer 12c is connected to the upper shield layer 8 via the coupling portion layer 12b.

Then, an overcoat layer 17 made of, for example, alumina is formed so as to cover the whole. Finally, mechanical processing is applied to a slider including the foregoing respective layers to form the air bearing surface 20 of the thin film magnetic head including the recording head and the reproducing head, so that the thin film magnetic head is completed.

The thin film magnetic head thus produced comprises the confronting surface (air bearing surface 20) confronting the recording medium, the reproducing head, and the recording head (induction-type electromagnetic transducer element). The reproducing head comprises the MR element 5, and the lower shield layer 3 and the upper shield layer 8 for shielding the MR element 5. The lower shield layer 3 and the upper shield layer 8 have portions on the side of the air bearing surface 20, which are disposed to confront each other with the MR element 5 sandwiched therebetween.

The recording head includes the magnetic pole portions confronting each other on the side of the air bearing surface 20, and comprises the lower magnetic pole layer (upper shield layer 8) and the upper magnetic pole layer 12 magnetically coupled to each other, the recording gap layer 9 provided between the magnetic pole portion of the lower magnetic pole layer and the magnetic pole portion of the upper magnetic pole layer 12, and the thin film coil 10, 15 of which at least part is disposed between the lower magnetic pole layer and the upper magnetic pole layer 12 in an insulated manner against them. In this thin film magnetic head, as shown in FIG. 9, a length from the air bearing surface 20 to an end of the insulating layer 11 on the side of the air bearing surface 20 becomes a throat height (identified by symbol TH in FIG. 9). The throat height represents a length (height) from the air bearing surface 20 to a position where an interval between the two magnetic pole layers starts to increase.

Operation of Thin Film Magnetic Head

Now, description will be made of an operation of the thin film magnetic head according to this embodiment. The thin film magnetic head records information on the recording medium using the recording head, while reproduces information recorded on the recording medium using the reproducing head.

In the reproducing head, a direction of a longitudinal bias magnetic field applied by the bias magnetic field applying layers 21 and 21 is the same as a track width direction. In the MR element 5, a magnetization direction of the soft magnetic layer 54 is set to the direction of the bias magnetic field in the state where no signal magnetic field exists. On the other hand, a magnetization direction of the ferromagnetic layer 52 is fixed to a direction perpendicular to the air bearing surface 20.

In the MR element 5, the magnetization direction of the soft magnetic layer 54 changes depending on a signal magnetic field from the recording medium, so that a relative angle between the magnetization direction of the soft magnetic layer 54 and the magnetization direction of the ferromagnetic layer 52 changes, and consequently, a resistance value of the MR element 5 changes. The resistance value of the MR element 5 can be derived from a potential difference between the two electrode layers 6 and 6 when a sense current is caused to flow through the MR element 5 by the two electrode layers 6 and 6. In this manner, the information recorded on the recording medium can be reproduced by the reproducing head.

As shown in FIG. 2, in the present invention, the pair of bias magnetic field applying layers 21 and 21 are disposed at both end portions of at least the soft magnetic layer 54 of the magneto-resistive effect film for applying the longitudinal bias magnetic field to the soft magnetic layer 54 via the magnetic underlayers 27 and 27. Further, it is configured such that mutual lattice point-to-point distances in the plane where each magnetic underlayer 27 and the corresponding bias magnetic field applying layer 21 are mated, are substantially equalized to each other. Therefore, a coercive force Hc in an in-plane direction (direction parallel to a film surface) of each bias magnetic field applying layer 21 can be maintained at a high level so that even when further gap narrowing or track narrowing is aimed, the bias magnetic field applying layers 21 and 21 can act to apply an effective bias magnetic field, i.e. can act to suppress occurrence of the Barkhausen noise.

Head Gimbal Assembly and Hard Disk Drive

Hereinbelow, description will be made of a head gimbal assembly and a hard disk drive according to an embodiment of the present invention.

Figure 11:
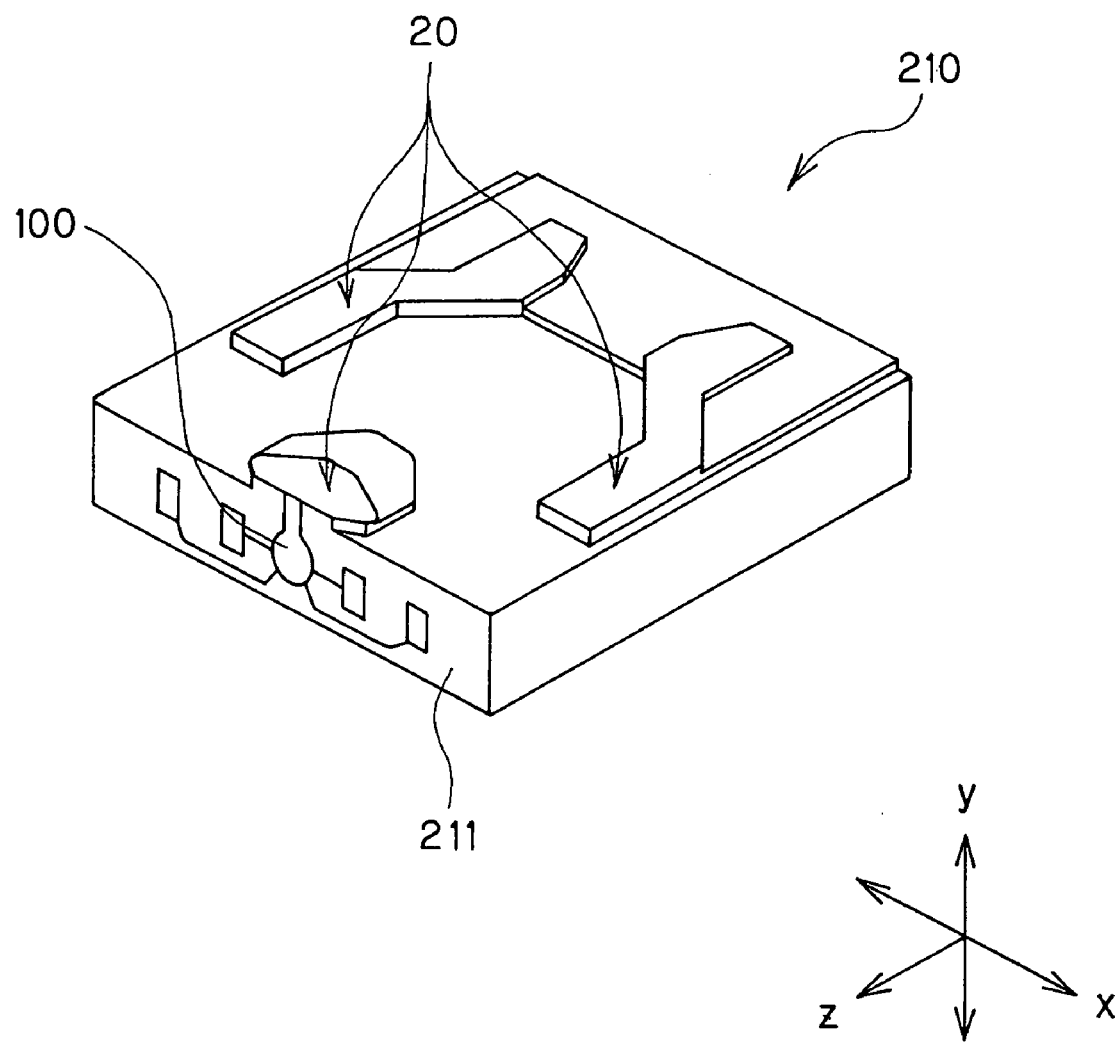
FIG. 11 is a perspective view showing a slider included in a head gimbal assembly in an embodiment of the present invention.

Referring first to FIG. 11, a slider 210 included in the head gimbal assembly will be described. In the hard disk drive, the slider 210 is disposed so as to confront a hard disk serving as a disc-shaped recording medium and driven to be rotated. The slider 210 comprises a base body 211 mainly composed of the substrate 1 and the overcoat layer 17 in FIG. 9.

The base body 211 has a generally hexahedral shape. One surface, among six surfaces, of the base body 211 is arranged to confront the hard disk. This one surface is formed with the air bearing surface 20.

When the hard disk is rotated in a z-direction in FIG. 11, lift is generated below the slider 210 in a y-direction in FIG. 11 because of an air flow passing between the hard disk and the slider 210. This lift causes the slider 210 to rise from the surface of the hard disk. Incidentally, an x-direction in FIG. 11 represents a track traverse direction of the hard disk.

A thin film magnetic head 100 according to this embodiment is formed in the neighborhood of an end portion (lower-left end portion in FIG. 11) of the slider 210 on an air exit side thereof.

Figure 12:
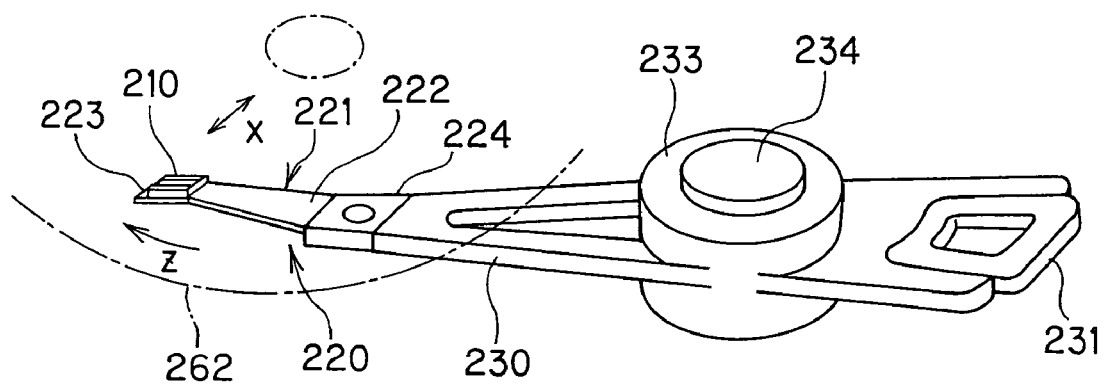
FIG. 12 is a perspective view showing a head arm assembly including the head gimbal assembly in the embodiment of the present invention.

Referring now to FIG. 12, description will be made of a head gimbal assembly 220 according to this embodiment. The head gimbal assembly 220 comprises the slider 210, and a suspension 221 elastically supporting the slider 210. The suspension 221 comprises a load beam 222 in the form of a blade spring made of, for example, stainless steel, a flexure 223 provided at one end of the load beam 222 and joined with the slider for giving a suitable degree of freedom to the slider 210, and a base plate 224 provided at the other end of the load beam 222.

The base plate 224 is adapted to be attached to an arm 230 of an actuator for moving the slider 210 in the track traverse direction x of a hard disk 262. The actuator comprises the arm 230 and a voice coil motor for driving the arm 230. In the flexure 223, a portion where the slider 210 is mounted, is provided with a gimbal portion for keeping constant a posture of the slider 210.

The head gimbal assembly 220 is attached to the arm 230 of the actuator. An assembly in which the head gimbal assembly 220 is attached to one arm 230 is called a head arm assembly. On the other hand, an assembly in which a carriage has a plurality of arms and the head gimbal assembly 220 is attached to each of the arms is called a head stack assembly.

FIG. 12 shows one example of the head arm assembly. In this head arm assembly, the head gimbal assembly 220 is attached to one end of the arm 230. To the other end of the arm 230 is attached a coil 231 forming part of the voice coil motor. At an intermediate portion of the arm 230 is provided a bearing portion 233 that is mounted on a shaft 234 for pivotally supporting the arm 230.

Figure 13:
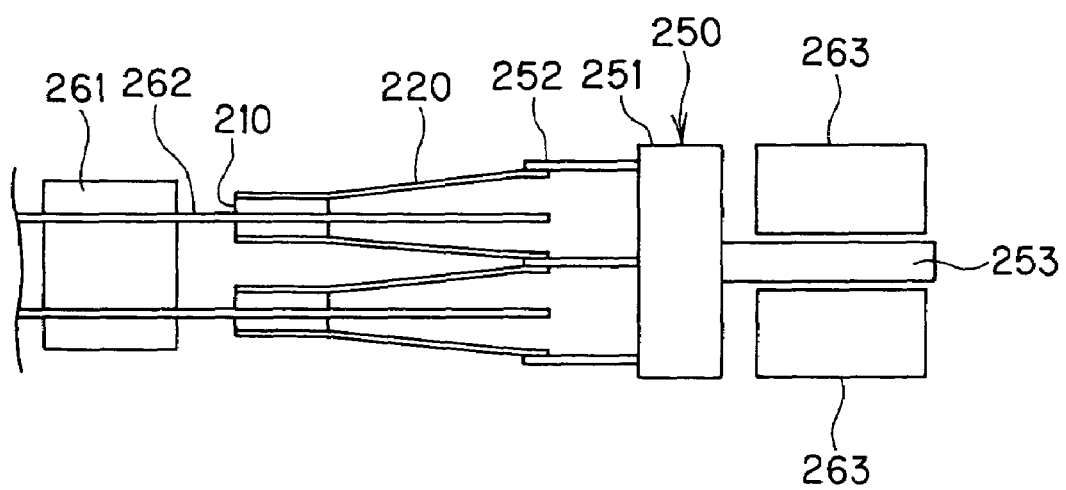
FIG. 13 is an explanatory diagram showing the main part of a hard disk drive in the embodiment of the present invention.
Figure 14:
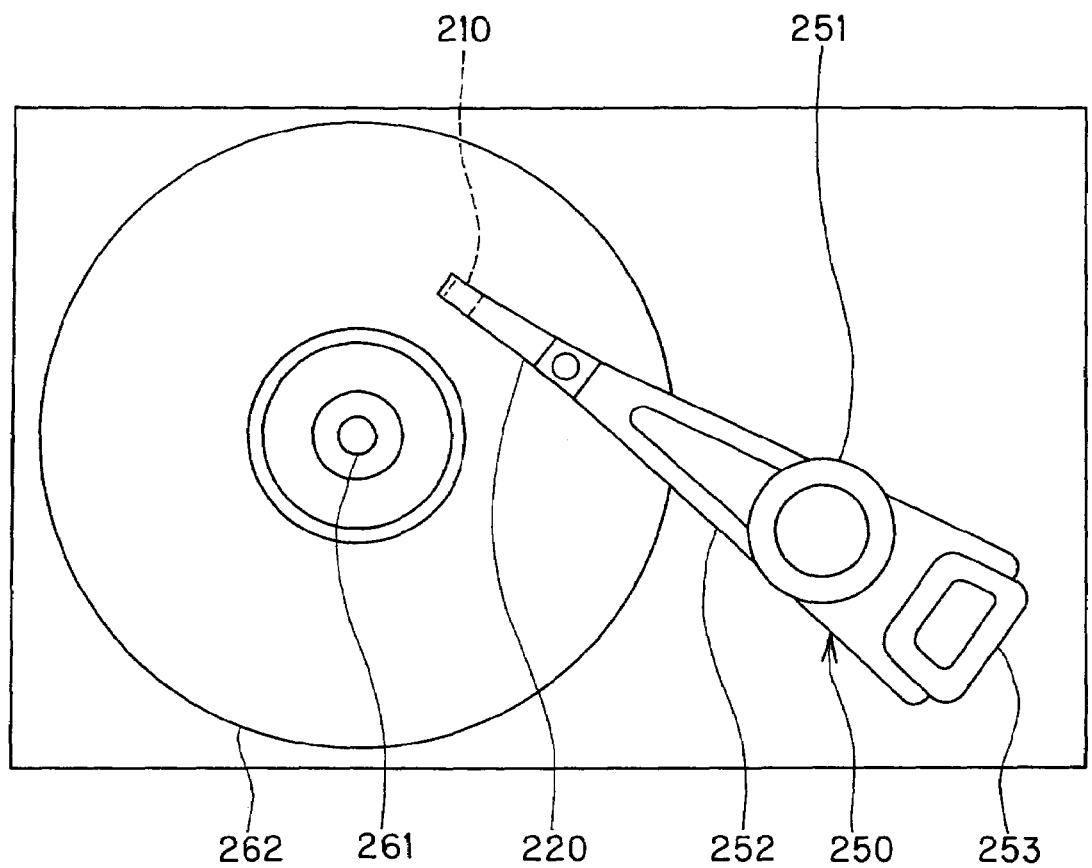
FIG. 14 is a plan view of the hard disk drive in the embodiment of the present invention.

Referring now to FIGS. 13 and 14, description will be made of one example of the head stack assembly and the hard disk drive according to this embodiment.

FIG. 13 is an explanatory diagram showing the main part of the hard disk drive, while FIG. 14 is a plan view of the hard disk drive.

A head stack assembly 250 comprises a carriage 251 having a plurality of arms 252. A plurality of head gimbal assemblies 220 are attached to the arms 252 so as to be adjacent to each other in the vertical direction with an interval therebetween. A coil 253 forming part of a voice coil motor is attached to the carriage 251 on the opposite side relative to the arms 252. The head stack assembly 250 is incorporated into the hard disk drive.

The hard disk drive has a plurality of hard disks 262 mounted on a spindle motor 261. Two sliders 210 are disposed for each of the hard disks 262 so as to confront each other with the hard disk 262 interposed therebetween. The voice coil motor has permanent magnets 263 that are disposed at positions to confront each other with the coil 253 interposed therebetween.

The head stack assembly 250 excluding the sliders 210 and the actuator correspond to a positioning device and serve to support the sliders 210 and to position the sliders 210 relative to the hard disks 262.

In the hard disk drive according to this embodiment, the sliders 210 are moved in the track traverse direction of the hard disks 262 and positioned relative to the hard disks 262 by the use of the actuator. The thin film magnetic head included in the slider 210 records information on the hard disk 262 using the recording head, while reproduces information recorded on the hard disk 262 using the reproducing head.

The head gimbal assembly and the hard disk drive according to this embodiment achieve the effect like that achieved by the thin film magnetic head according to the foregoing embodiment.

The description has been made of the thin film magnetic head having the structure wherein the reproducing head is formed on the side of the substrate, then the recording head is stacked thereon. However, this stacking order may be reversed. Further, when used only for reading, the thin film magnetic head may be configured to have only the reproducing head.

Hereinbelow, specific test examples will be shown to describe the structure of the thin film magnetic head of the present invention in further detail.

In Test Example 1 to Test Example 6 shown below, tests were conducted to examine a relationship between a matching degree $\gamma$ of mutual lattice point-to-point distances in the plane where the magnetic underlayer 27 and the bias magnetic field applying layer 21 are mated, i.e. $\gamma = \sqrt{2}a/((\sqrt{3}b+c)/2)$, and an occurrence rate (%) of the Barkhausen noise, wherein the track width was set extremely narrow.

Details will be described hereinbelow.

TEST EXAMPLE 1

Reproducing head samples were prepared each having a pinning layer bottom type spin-valve magneto-resistive effect element in which a pinning layer 51 is located at the bottom as shown in FIG. 2. Hereinbelow, only the principal part of the test will be described.

As shown in FIG. 9, a lower shield layer 3 of NiFe was formed, then a lower shield gap film 4 of $Al_2O_3$ was formed thereon, and then a stacked film constituting a magneto-resistive effect element was formed thereon. Specifically, on the lower shield gap film 4 of Al$_2$O$_3$ was formed the stacked film composed of an underlayer 25 (NiCr; thickness 5 nm), a pinning layer 51 (PtMn antiferromagnetic layer; thickness 20 nm), a ferromagnetic layer 52 (ferromagnetic layer made of a three-layer stacked body of CoFe (thickness 1.5 nm)/Ru (thickness 0.8 nm)/CoFe (thickness 2 nm)), a nonmagnetic layer 53 (Cu; thickness 2 nm), a soft magnetic layer 54 (soft magnetic layer made of a two-layer stacked body of CoFe (thickness 1 nm)/NiFe (thickness 3 nm)), and a protective layer 55 (Ta; thickness 2 Å).

Fixation of a magnetization direction of the ferromagnetic layer 52 by the pinning layer 51 was carried out in a vacuum by a heat treatment wherein a temperature was 300° C., an applied magnetic field was 10 kOe, and a treatment time was 5 hours.

Then, a mask was formed on the magneto-resistive effect film for defining a shape of the MR element by etching. This mask was formed by patterning a resist layer made of two organic films to have a shape with an undercut to make a bottom surface smaller than an upper surface.

The magneto-resistive effect film was selectively subjected to dry etching such as ion milling by the use of the mask to thereby obtain a patterned magneto-resistive effect element. Then, after etching portions of the magneto-resistive effect element where bias magnetic field applying layers 21 and 21 should be disposed, magnetic underlayers 27 and 27 (FeCoMo; thickness 2.0 nm for each) and the bias magnetic field applying layers 21 and 21 (CoPt (80:20 (at %)); thickness 30 nm for each) were formed on the underlayer 25. Then, electrode layers 6 and 6 (Au; thickness 40 nm for each) were formed on the bias magnetic field applying layers 21 and 21.

A reproduction track width RTW (shown in FIG. 2) was set to 120 nm.

The bias magnetic field applying layers 21 and 21 were magnetized under the magnetization condition at room temperature in a magnetic field of 2 kOe for 60 seconds, and applied a longitudinal bias magnetic field to the soft magnetic layer 54.

On such an MR element was formed an upper shield gap film of Al$_2$O$_3$ and an upper shield layer of NiFe to prepare one kind of reproducing head sample necessary for the test.

Then, in the same manner, various reproducing head samples were prepared wherein a matching degree γ of mutual lattice point-to-point distances in the plane where the magnetic underlayer 27 and the bias magnetic field applying layer 21 are mated, i.e. γ=√2a/((√3b+c)/2), was changed.

Specifically, in Test Example 1, for changing the matching degree γ of mutual lattice point-to-point distances in the plane where the magnetic underlayer 27 and the bias magnetic field applying layer 21 are mated, i.e. γ=√2a((√3b+c)/2), the content of Mo in each magnetic underlayer 27 made of FeCoMo was changed in a range of 0 to 21 at % to change a value of √2a, thereby to prepare various samples with different matching degrees γ.

Figure 15:
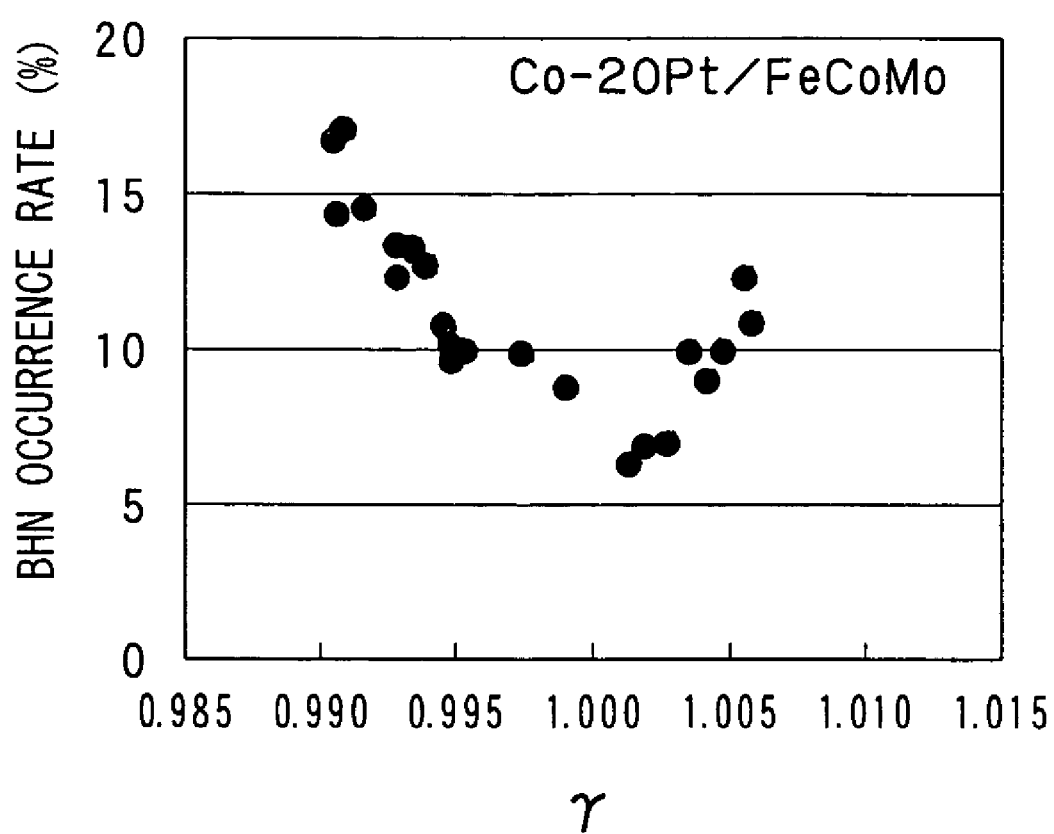
FIG. 15 is a graph showing a relationship between matching degree γ of mutual lattice point-to-point distances in the plane where a magnetic underlayer and a bias magnetic field applying layer are mated, and occurrence rate (%) of the Barkhausen noise (BHN)

With respect to these various samples, occurrence rates (%) of the Barkhausen noise were measured, respectively, in the following manner to obtain a graph showing a relationship between the matching degree γ of mutual lattice point-to-point distances in the plane where the magnetic underlayer 27 and the bias magnetic field applying layer 21 are mated, and the occurrence rate (%) of the Barkhausen noise, as shown in FIG. 15.

Occurrence Rate (%) of Barkhausen Noise

The occurrence rate (%) of the Barkhausen noise (BHN) was defined as a rate of the number of times of detection of noise when reproduction was repeated 1000 times.

As shown in the graph of FIG. 15, it has been confirmed that although the setting was adapted for high recording density in which the reproduction track width RTW was set to 120 nm, i.e. extremely narrow, there can be obtained a high-quality reproducing head with the occurrence rate of the Barkhausen noise being 10% or less in the range of the matching degree γ of mutual lattice point-to-point distances being 0.995 to 1.005.

TEST EXAMPLE 2

In the foregoing Test Example 1, the material of the bias magnetic field applying layers 21 and 21 was changed from CoPt (80:20 (at %)) to CoCrPt (78:9:13 (at %)). Other processing followed the technique in the foregoing Test Example 1. For changing the matching degree γ=√2a/((√3b+c)/2), the content of Mo in each magnetic underlayer 27 made of FeCoMo was changed in a range of 0 to 21 at % to change a value of √2a, thereby to prepare various samples with different matching degrees γ.

Figure 16:
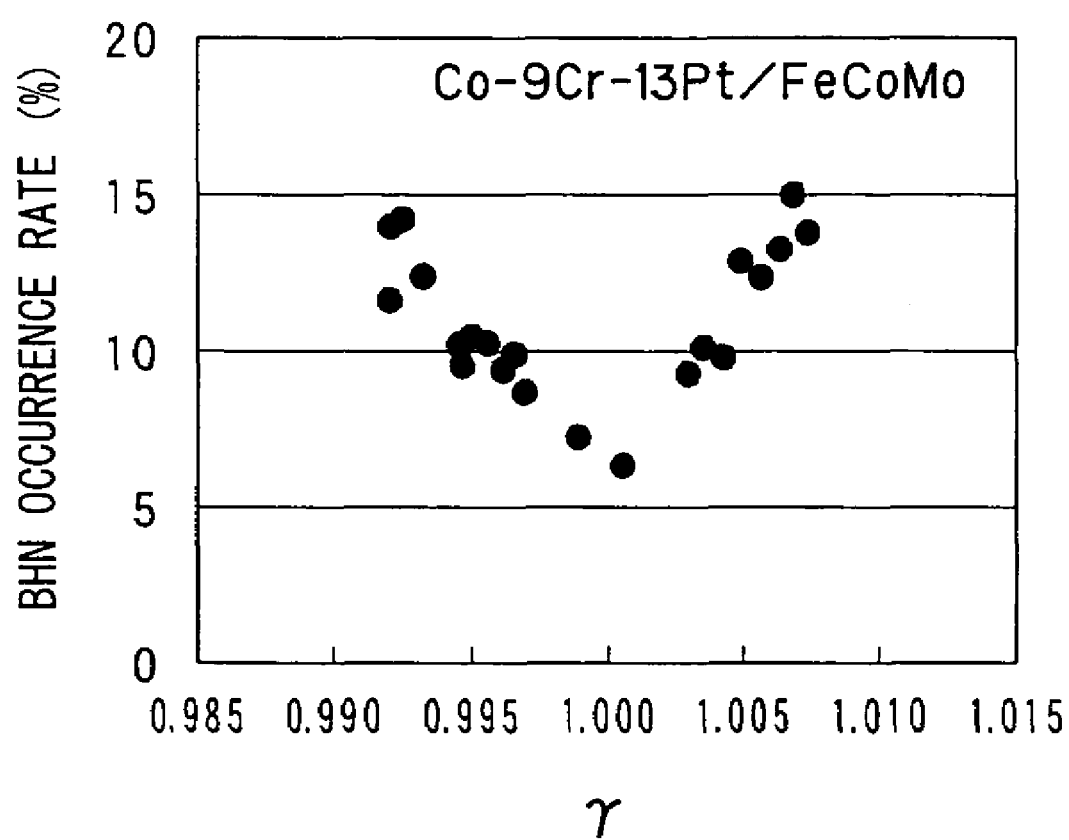
FIG. 16 is a graph showing a relationship between matching degree γ of mutual lattice point-to-point distances in the plane where a magnetic underlayer and a bias magnetic field applying layer are mated, and occurrence rate (%) of the Barkhausen noise (BHN)

With respect to these various samples, occurrence rates (%) of the Barkhausen noise (BHN) were measured, respectively, to obtain a graph showing a relationship between the matching degree γ of mutual lattice point-to-point distances in the plane where the magnetic underlayer 27 and the bias magnetic field applying layer 21 are mated, and the occurrence rate (%) of the Barkhausen noise (BHN), as shown in FIG. 16.

As shown in the graph of FIG. 16, it has been confirmed that although the setting was adapted for high recording density in which the reproduction track width RTW was set to 120 nm, i.e. extremely narrow, there can be obtained a high-quality reproducing head with the occurrence rate of the Barkhausen noise being 10% or less in the range of the matching degree γ of mutual lattice point-to-point distances being 0.995 to 1.005.

TEST EXAMPLE 3

In the foregoing Test Example 1, the material of the bias magnetic field applying layers 21 and 21 was changed from CoPt (80:20 (at %)) to CoCrPt (75:15:10 (at %)). Other processing followed the technique in the foregoing Test Example 1. For changing the matching degree γ=√2a/((√3b+c)/2), the content of Mo in each magnetic underlayer 27 made of FeCoMo was changed in a range of 0 to 21 at % to change a value of √2a, thereby to prepare various samples with different matching degrees γ.

With respect to these various samples, occurrence rates (%) of the Barkhausen noise (BHN) were measured, respectively, to obtain a graph showing a relationship between the matching degree γ of mutual lattice point-to-point distances in the plane where the magnetic underlayer 27 and the bias magnetic field applying layer 21 are mated, and the occurrence rate (%) of the Barkhausen noise (BHN), as shown in FIG. 17.

As shown in the graph of FIG. 17, it has been confirmed that although the setting was adapted for high recording density in which the reproduction track width RTW was set to 120 nm, i.e. extremely narrow, there can be obtained a high-quality reproducing head with the occurrence rate of the Barkhausen noise being 10% or less in the range of the matching degree γ of mutual lattice point-to-point distances being 0.995 to 1.005.

TEST EXAMPLE 4

In the foregoing Test Example 1, the material of the bias magnetic field applying layers 21 and 21 was kept as CoPt (80:20 (at %)), while the material of the magnetic underlayers 27 and 27 was changed from FeCoMo to FeCoW. Other processing followed the technique in the foregoing Test Example 1. For changing the matching degree γ=√2a/((√3b+c)/2), the content of W in each magnetic underlayer 27 made of FeCoW was changed in a range of 0 to 16 at % to change a value of √2a, thereby to prepare various samples with different matching degrees γ.

Figure 18:
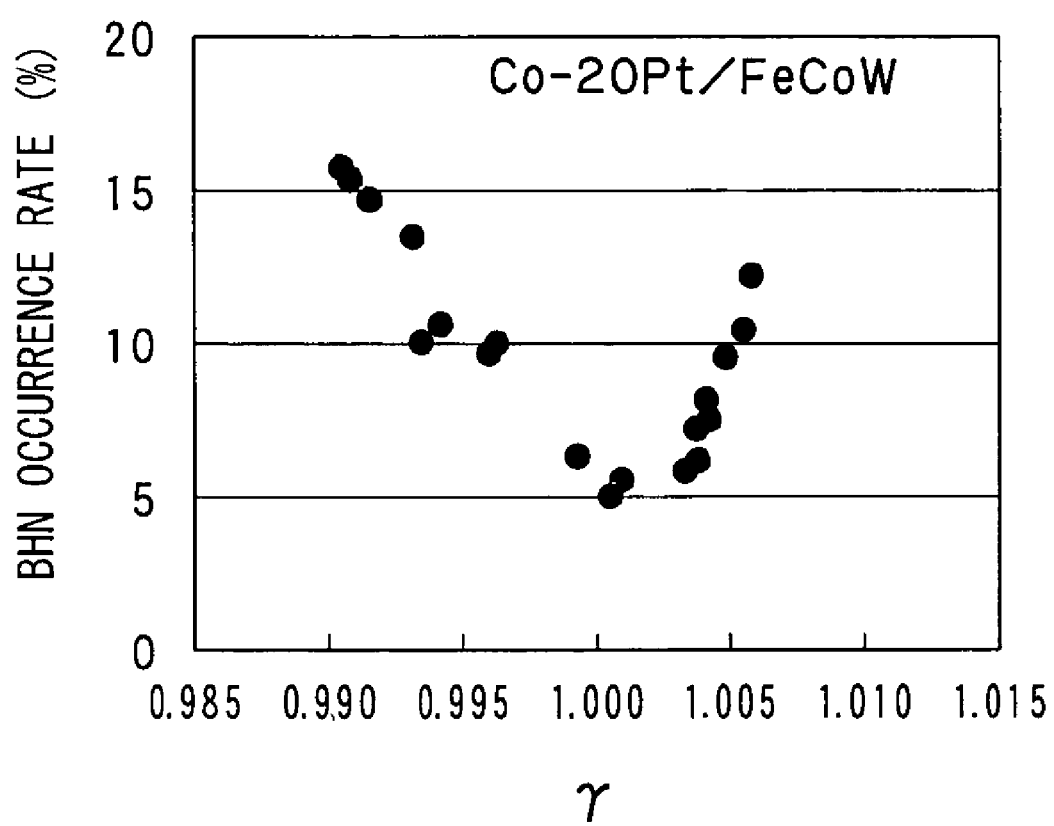
FIG. 18 is a graph showing a relationship between matching degree γ of mutual lattice point-to-point distances in the plane where a magnetic underlayer and a bias magnetic field applying layer are mated, and occurrence rate (%) of the Barkhausen noise (BHN)

With respect to these various samples, occurrence rates (%) of the Barkhausen noise (BHN) were measured, respectively, to obtain a graph showing a relationship between the matching degree γ of mutual lattice point-to-point distances in the plane where the magnetic underlayer 27 and the bias magnetic field applying layer 21 are mated, and the occurrence rate (%) of the Barkhausen noise (BHN), as shown in FIG. 18.

As shown in the graph of FIG. 18, it has been confirmed that although the setting was adapted for high recording density in which the reproduction track width RTW was set to 120 nm, i.e. extremely narrow, there can be obtained a high-quality reproducing head with the occurrence rate of the Barkhausen noise being 10% or less in the range of the matching degree γ of mutual lattice point-to-point distances being 0.995 to 1.005.

TEST EXAMPLE 5

In the foregoing Test Example 2, the material of the bias magnetic field applying layers 21 and 21 was kept as CoCrPt (78:9:13 (at %)), while the material of the magnetic underlayers 27 and 27 was changed from FeCoMo to FeCoW. Other processing followed the technique in the foregoing Test Example 2. For changing the matching degree γ=√2a/((√3b+c)/2), the content of W in each magnetic underlayer 27 made of FeCoW was changed in a range of 0 to 16 at % to change a value of √2a, thereby to prepare various samples with different matching degrees γ.

Figure 19:
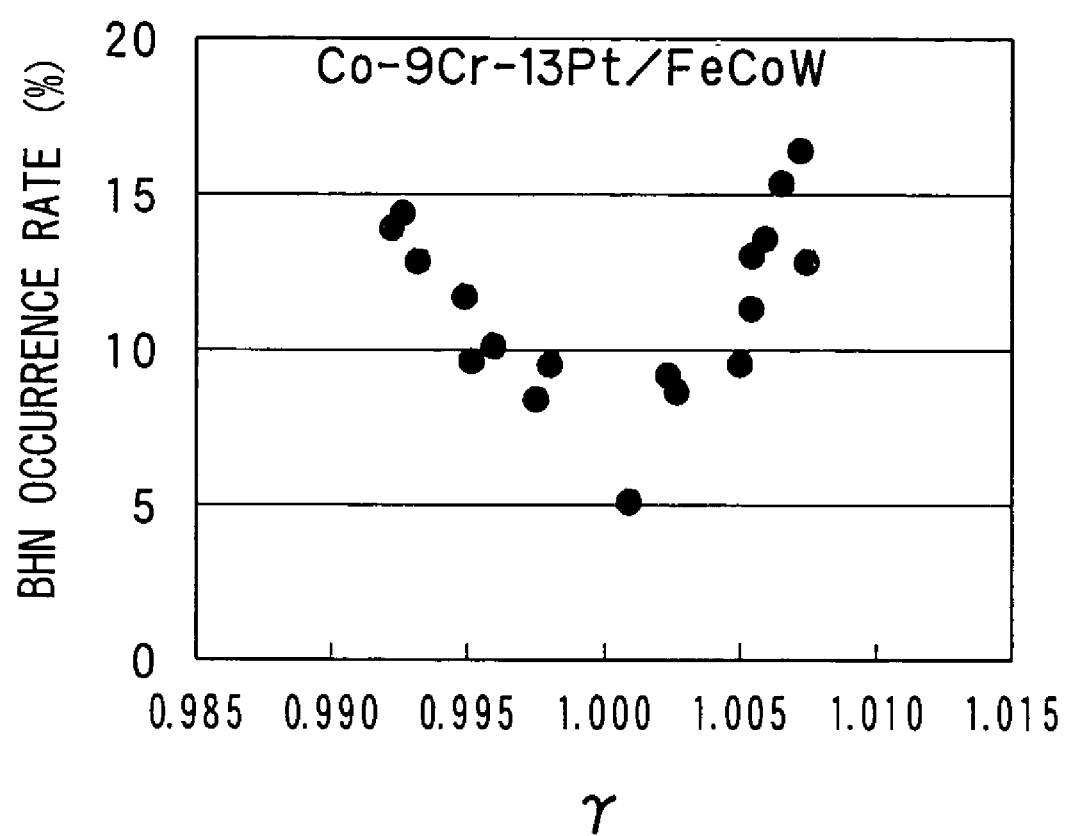
FIG. 19 is a graph showing a relationship between matching degree γ of mutual lattice point-to-point distances in the plane where a magnetic underlayer and a bias magnetic field applying layer are mated, and occurrence rate (%) of the Barkhausen noise (BHN)

With respect to these various samples, occurrence rates (%) of the Barkhausen noise (BHN) were measured, respectively, to obtain a graph showing a relationship between the matching degree γ of mutual lattice point-to-point distances in the plane where the magnetic underlayer 27 and the bias magnetic field applying layer 21 are mated, and the occurrence rate (%) of the Barkhausen noise (BHN), as shown in FIG. 19.

As shown in the graph of FIG. 19, it has been confirmed that although the setting was adapted for high recording density in which the reproduction track width RTW was set to 120 nm, i.e. extremely narrow, there can be obtained a high-quality reproducing head with the occurrence rate of the Barkhausen noise being 10% or less in the range of the matching degree γ of mutual lattice point-to-point distances being 0.995 to 1.005.

TEST EXAMPLE 6

In the foregoing Test Example 3, the material of the bias magnetic field applying layers 21 and 21 was kept as CoCrPt (75:15:10 (at %)), while the material of the magnetic underlayers 27 and 27 was changed from FeCoMo to FeCoW. Other processing followed the technique in the foregoing Test Example 3. For changing the matching degree γ=√2a/((√3b+c)/2), the content of W in each magnetic underlayer 27 made of FeCoW was changed in a range of 0 to 16 at % to change a value of √2a, thereby to prepare various samples with different matching degrees γ.

Figure 20:
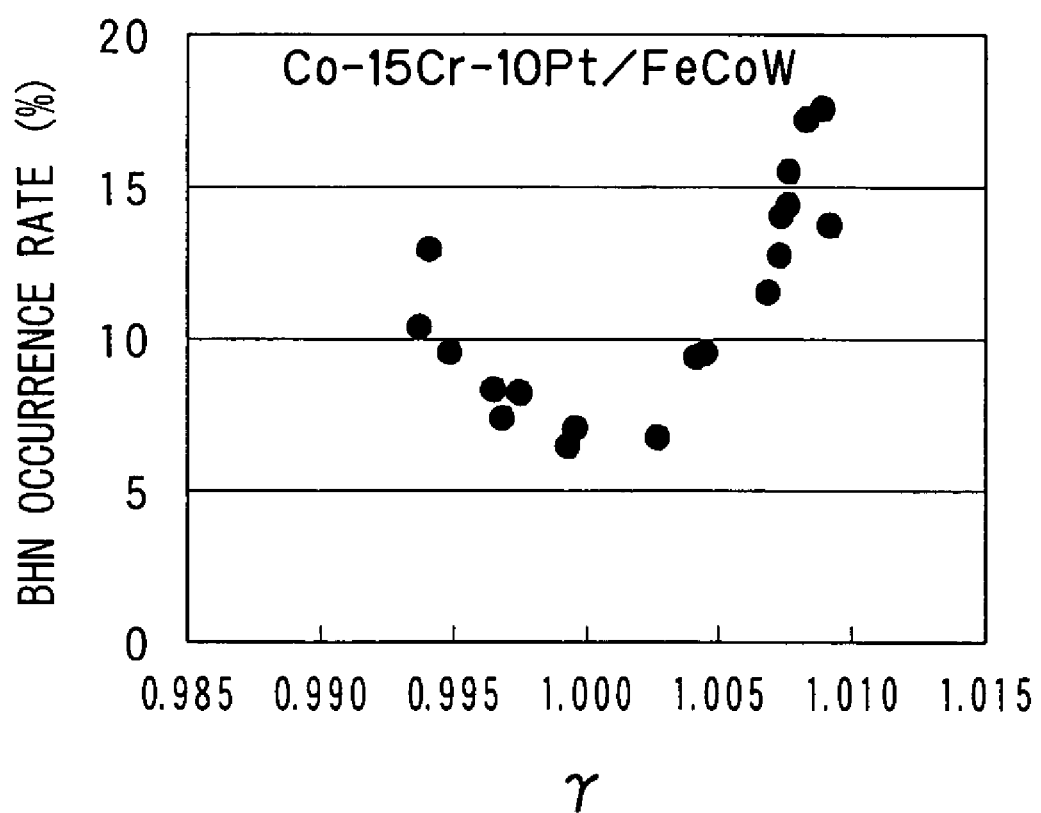
FIG. 20 is a graph showing a relationship between matching degree γ of mutual lattice point-to-point distances in the plane where a magnetic underlayer and a bias magnetic field applying layer are mated, and occurrence rate (%) of the Barkhausen noise (BHN)

With respect to these various samples, occurrence rates (%) of the Barkhausen noise (BHN) were measured, respectively, to obtain a graph showing a relationship between the matching degree γ of mutual lattice point-to-point distances in the plane where the magnetic underlayer 27 and the bias magnetic field applying layer 21 are mated, and the occurrence rate (%) of the Barkhausen noise (BHN), as shown in FIG. 20.

As shown in the graph of FIG. 20, it has been confirmed that although the setting was adapted for high recording density in which the reproduction track width RTW was set to 120 nm, i.e. extremely narrow, there can be obtained a high-quality reproducing head with the occurrence rate of the Barkhausen noise being 10% or less in the range of the matching degree γ of mutual lattice point-to-point distances being 0.995 to 1.005.

Incidentally, a matching degree γ of mutual lattice point-to-point distances in the combination of a magnetic underlayer of FeCo (85:15) and a bias magnetic field applying layer of CoPt (80:20) disclosed in paragraph [0060] of the foregoing JP-A-H10-312512 and JP-A-H10-312514 was 0.990, and an occurrence rate of the Barkhausen noise was 16.6% in the setting of the reproduction track width being 120 nm.

The effect of the present invention is clear from the foregoing results. Specifically, the thin film magnetic head of the present invention comprises the magneto-resistive effect element having the magneto-resistive effect film, wherein the magneto-resistive effect film is the multilayer film comprising the nonmagnetic layer, the ferromagnetic layer formed on one surface of the nonmagnetic layer, the soft magnetic layer formed on the other surface of the nonmagnetic layer, and the pinning layer formed so as to contact with one surface of the ferromagnetic layer (a surface of the ferromagnetic layer opposite to a surface thereof contacting with the nonmagnetic layer) for pinning the magnetization direction of the ferromagnetic layer, wherein, at both end portions of at least the soft magnetic layer of the magneto-resistive effect film, the pair of bias magnetic field applying layers are disposed for applying the longitudinal bias magnetic field to the soft magnetic layer via the magnetic underlayers, and wherein mutual lattice point-to-point distances in the plane where each of the magnetic underlayers and the corresponding bias magnetic field applying layer are mated, are substantially equal to each other. Therefore, the coercive force Hc in the in-plane direction of each of the bias magnetic field applying layers can be maintained at a high level so that even when further gap narrowing or track narrowing is aimed, an effective bias magnetic field can be applied to thereby suppress occurrence of the Barkhausen noise. That is, the effect of the present invention is exhibited further markedly as the reproduction track width is reduced more and more coping with higher recording densification.

What is claimed is:

1. A thin film magnetic head comprising a magneto-resistive effect element having a magneto-resistive effect film,
wherein said magneto-resistive effect film is a multilayer film comprising a nonmagnetic layer, a ferromagnetic layer formed on one surface of said nonmagnetic layer, a soft magnetic layer formed on the other surface of said nonmagnetic layer, and a pinning layer formed so as to contact with one surface of said ferromagnetic layer for pinning a magnetization direction of said ferromagnetic layer, said one surface of said ferromagnetic layer opposite to the surface thereof contacting with said nonmagnetic layer, wherein, at both end portions of at least said soft magnetic layer of said magneto-resistive effect film, a pair of bias magnetic field applying layers are disposed for applying a longitudinal bias magnetic field to said soft magnetic layer via magnetic underlayers, and wherein mutual lattice point-to-point distances in a plane where each of said magnetic underlayers and the corresponding bias magnetic field applying layer are mated, are substantially equal to each other within an allowable error range of ±0.5%.

2. The thin film magnetic head according to claim 1, wherein each of said bias magnetic field applying layers is made of a Co hard magnetic layer containing Co as a main component, and each of said magnetic underlayers is made of a material that contains FeCo as a main component and at least one selected from the group consisting of Mo, W, Ni, Cr, Nb, Ta, V, Pt, Pd, Ir, Rh, Ru, and Au.

3. The thin film magnetic head according to claim 2, wherein said Co hard magnetic layer is made of CoPt, CoCrPt, CoCrTa, or an alloy containing one of them.

4. The thin film magnetic head according to claim 3, wherein each of said magnetic underlayers is made of FeCoMo, and the content of Mo is 5 to 15 at %.

5. The thin film magnetic head according to claim 3, wherein each of said magnetic underlayers is made of FeCoW, and the content of W is 3 to 10 at %.

6. The thin film magnetic head according to claim 1, wherein a thickness of each of said magnetic underlayers is 1.2 to 5.5 nm.

7. A thin film magnetic head comprising a magneto-resistive effect element having a magneto-resistive effect film, wherein said magneto-resistive effect film is a multilayer film comprising a nonmagnetic layer, a ferromagnetic layer formed on one surface of said nonmagnetic layer, a soft magnetic layer formed on the other surface of said nonmagnetic layer, and a pinning layer formed so as to contact with one surface of said ferromagnetic layer for pinning a magnetization direction of said ferromagnetic layer, said one surface of said ferromagnetic layer opposite to the surface thereof contacting with said nonmagnetic layer, wherein, at both end portions of at least said soft magnetic layer of said magneto-resistive effect film, a pair of bias magnetic field applying layers are disposed for applying a longitudinal bias magnetic field to said soft magnetic layer via magnetic underlayers, wherein each of said magnetic underlayers has a crystal structure of a hexahedral cubic system, and an isodiametric lattice constant thereof is represented by a value a, wherein each of said bias magnetic field applying layers has a crystal structure of a hexagonal prism hexagonal system, a lattice constant in a hexagonal plane thereof is represented by a value b, and a lattice constant in a height direction of a hexagonal prism thereof is represented by a value c, and wherein a ratio between a value of $\sqrt{2}a$ and a value of $(\sqrt{3}b+c)/2$ is set within a range of 0.995 to 1.005 so that mutual lattice point-to-point distances in a plane where each of said magnetic underlayers and the corresponding bias magnetic field applying layer are mated, are substantially equalized to each other.

8. The thin film magnetic head according to claim 7, wherein each of said bias magnetic field applying layers is made of a Co hard magnetic layer containing Co as a main component, and each of said magnetic underlayers is made of a material that contains FeCo as a main component and at least one selected from the group consisting of Mo, W, Ni, Cr, Nb, Ta, V, Pt, Pd, Ir, Rh, Ru, and Au.

9. The thin film magnetic head according to claim 8, wherein said Co hard magnetic layer is made of CoPt, CoCrPt, CoCrTa, or an alloy containing one of them.

10. The thin film magnetic head according to claim 9, wherein each of said magnetic underlayers is made of FeCoMo, and the content of Mo is 5 to 15 at %.

11. The thin film magnetic head according to claim 9, wherein each of said magnetic underlayers is made of FeCoW, and the content of W is 3 to 10 at %.

12. A head gimbal assembly comprising:
a slider including a thin film magnetic head and disposed so as to confront a recording medium; and
a suspension elastically supporting said slider,
wherein said thin film magnetic head comprises a magneto-resistive effect element having a magneto-resistive effect film,
wherein said magneto-resistive effect film is a multilayer film comprising a nonmagnetic layer, a ferromagnetic layer formed on one surface of said nonmagnetic layer, a soft magnetic layer formed on the other surface of said nonmagnetic layer, and a pinning layer formed so as to contact with one surface of said ferromagnetic layer for pinning a magnetization direction of said ferromagnetic layer, said one surface of said ferromagnetic layer opposite to the surface thereof contacting with said nonmagnetic layer,
wherein, at both end portions of at least said soft magnetic layer of said magneto-resistive effect film, a pair of bias magnetic field applying layers are disposed for applying a longitudinal bias magnetic field to said soft magnetic layer via magnetic underlayers, and
wherein mutual lattice point-to-point distances in a plane where each of said magnetic underlayers and the corresponding bias magnetic field applying layer are mated, are substantially equal to each other within an allowable error range of ±0.5%.

13. A head gimbal assembly comprising:
a slider including a thin film magnetic head and disposed so as to confront a recording medium; and
a suspension elastically supporting said slider,
wherein said thin film magnetic head comprises a magneto-resistive effect element having a magneto-resistive effect film,
wherein said magneto-resistive effect film is a multilayer film comprising a nonmagnetic layer, a ferromagnetic layer formed on one surface of said nonmagnetic layer, a soft magnetic layer formed on the other surface of said nonmagnetic layer, and a pinning layer formed so as to contact with one surface of said ferromagnetic layer for pinning a magnetization direction of said ferromagnetic layer, said one surface of said ferromagnetic layer opposite to the surface thereof contacting with said nonmagnetic layer,
wherein, at both end portions of at least said soft magnetic layer of said magneto-resistive effect film, a pair of bias magnetic field applying layers are disposed for applying a longitudinal bias magnetic field to said soft magnetic layer via magnetic underlayers, wherein each of said magnetic underlayers has a crystal structure of a hexahedral cubic system, and an isodiametric lattice constant thereof is represented by a value a, wherein each of said bias magnetic field applying layers has a crystal structure of a hexagonal prism hexagonal system, a lattice constant in a hexagonal plane thereof is represented by a value b, and a lattice constant in a height direction of a hexagonal prism thereof is represented by a value c, and wherein a ratio between a value of $\sqrt{2}a$ and a value of $(\sqrt{3}b+c)/2$ is set within a range of 0.995 to 1.005 so that mutual lattice point-to-point distances in a plane where each of said magnetic underlayers and the corresponding bias magnetic field applying layer are mated, are substantially equalized to each other.

14. A hard disk drive comprising:

a slider including a thin film magnetic head and disposed so as to confront a disc-shaped recording medium driven to be rotated; and a positioning device supporting said slider and positioning said slider relative to said recording medium, wherein said thin film magnetic head comprises a magneto-resistive effect element having a magneto-resistive effect film, wherein said magneto-resistive effect film is a multilayer film comprising a nonmagnetic layer, a ferromagnetic layer formed on one surface of said nonmagnetic layer, a soft magnetic layer formed on the other surface of said nonmagnetic layer, and a pinning layer formed so as to contact with one surface of said ferromagnetic layer for pinning a magnetization direction of said ferromagnetic layer, said one surface of said ferromagnetic layer opposite to the surface thereof contacting with said nonmagnetic layer, wherein, at both end portions of at least said soft magnetic layer of said magneto-resistive effect film, a pair of bias magnetic field applying layers are disposed for applying a longitudinal bias magnetic field to said soft magnetic layer via magnetic underlayers, and wherein mutual lattice point-to-point distances in a plane where each of said magnetic underlayers and the corresponding bias magnetic field applying layer are mated, are substantially equal to each other within an allowable error range of ±0.5%.

15. A hard disk drive comprising:

a slider including a thin film magnetic head and disposed so as to confront a disc-shaped recording medium driven to be rotated; and a positioning device supporting said slider and positioning said slider relative to said recording medium, wherein said thin film magnetic head comprises a magneto-resistive effect element having a magneto-resistive effect film, wherein said magneto-resistive effect film is a multilayer film comprising a nonmagnetic layer, a ferromagnetic layer formed on one surface of said nonmagnetic layer, a soft magnetic layer formed on the other surface of said nonmagnetic layer, and a pinning layer formed so as to contact with one surface of said ferromagnetic layer for pinning a magnetization direction of said ferromagnetic layer, said one surface of said ferromagnetic layer opposite to the surface thereof contacting with said nonmagnetic layer, wherein, at both end portions of at least said soft magnetic layer of said magneto-resistive effect film, a pair of bias magnetic field applying layers are disposed for applying a longitudinal bias magnetic field to said soft magnetic layer via magnetic underlayers, wherein each of said magnetic underlayers has a crystal structure of a hexahedral cubic system, and an isodiametric lattice constant thereof is represented by a value a, wherein each of said bias magnetic field applying layers has a crystal structure of a hexagonal prism hexagonal system, a lattice constant in a hexagonal plane thereof is represented by a value b, and a lattice constant in a height direction of a hexagonal prism thereof is represented by a value c, and wherein a ratio between a value of $\sqrt{2}a$ and a value of $(\sqrt{3}b+c)/2$ is set within a range of 0.995 to 1.005 so that mutual lattice point-to-point distances in a plane where each of said magnetic underlayers and the corresponding bias magnetic field applying layer are mated, are substantially equalized to each other.

* * * * *